(12) United States Patent
Hirzallah et al.

(10) Patent No.: US 12,375,143 B2
(45) Date of Patent: Jul. 29, 2025

(54) DIVERGENCE STATISTICAL APPROACH FOR NARROW BEAM-BASED CHANNEL ACCESS

(71) Applicant: QUALCOMM Incorporated, San Diego, CA (US)

(72) Inventors: Mohammed Ali Mohammed Hirzallah, San Diego, CA (US); Arumugam Chendamarai Kannan, San Diego, CA (US); Srinivas Yerramalli, San Diego, CA (US); Giovanni Chisci, San Diego, CA (US); Vinay Chande, San Diego, CA (US); Jing Sun, San Diego, CA (US); Xiaoxia Zhang, San Diego, CA (US); Aleksandar Damnjanovic, Del Mar, CA (US); Marco Papaleo, Bologna (IT); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/550,423

(22) PCT Filed: Sep. 21, 2021

(86) PCT No.: PCT/US2021/051390
§ 371 (c)(1),
(2) Date: Sep. 13, 2023

(87) PCT Pub. No.: WO2022/235288
PCT Pub. Date: Nov. 10, 2022

(65) Prior Publication Data
US 2024/0171240 A1    May 23, 2024

(30) Foreign Application Priority Data
May 6, 2021 (IN) .............................. 202121020672

(51) Int. Cl.
*H04B 7/06* (2006.01)
*H04W 74/0808* (2024.01)

(52) U.S. Cl.
CPC ......... *H04B 7/0617* (2013.01); *H04B 7/0695* (2013.01); *H04W 74/0808* (2013.01)

(58) Field of Classification Search
CPC ...... H04B 7/06; H04B 7/0613; H04B 7/0615; H04B 7/0617; H04B 7/0621;
(Continued)

(56) References Cited

U.S. PATENT DOCUMENTS 7,773,964 B2 *   8/2010   Ozaki ................... H04W 24/00
                                                                455/226.1
7,925,253 B2 *   4/2011   Breit .................... G01R 29/105
                                                                455/418
(Continued)

FOREIGN PATENT DOCUMENTS

WO    2019226028 A1    11/2019

OTHER PUBLICATIONS

3GPP TR 38.810: "3rd Generation Partnership Project, Technical Specification Group Radio Access Network, NR, Study on Test Methods, (Release 16)" 3GPP Standard, Technical Report, 3GPP TR 38.810, V16.6.1 (Sep. 2020), 3rd Generation Partnership Project (3GPP), Mobile Competence Centre, 650, Route Des Lucioles, F-06921 Sophia-Antipolis Cedex, France, vol. RAN WG4, No. V16.6.1, Nov. 4, 2020, XP051999747, pp. 1-171.
(Continued)

Primary Examiner — James M Perez
(74) Attorney, Agent, or Firm — Haynes and Boone LLP

(57) ABSTRACT

Wireless communications systems and methods related to accessing a channel based on an interference condition in a wireless communication network are provided. For example, a method of wireless communication performed by
(Continued)

a wireless communications device may include receiving, from a second wireless communication device, one or more signals associated with a beam parameter, determining, at each of a plurality of locations, a signal measurement for at least one received signal of the one or more received signals, and determining, based at least in part on a cumulative distribution of the signal measurements at the plurality of locations and a reference probability distribution, whether the second wireless communication device satisfies an interference condition. Other features are also claimed and described.

30 Claims, 13 Drawing Sheets

(58) Field of Classification Search
CPC .. H04B 7/0628; H04B 7/0686; H04B 7/0695; H04B 7/06952; H04W 74/08; H04W 74/0808
See application file for complete search history.

(56) References Cited

U.S. PATENT DOCUMENTS

| | | | | |
|---|---|---|---|---|
| 8,467,756 B2* | 6/2013 | Ozaki | | H04B 17/327 455/226.1 |
| 10,142,772 B2* | 11/2018 | Cavendish | | H04W 4/023 |
| 10,142,816 B2* | 11/2018 | Cavendish | | H04W 4/70 |
| 10,404,384 B1* | 9/2019 | Mellein | | H04W 24/06 |
| 10,461,421 B1* | 10/2019 | Tran | | H01Q 3/20 |
| 10,694,399 B1* | 6/2020 | Tran | | H01Q 3/01 |
| 10,735,066 B2* | 8/2020 | Mo | | H04B 7/0482 |
| 10,812,992 B1* | 10/2020 | Tran | | H04B 7/0695 |
| 10,841,732 B2* | 11/2020 | Cavendish | | H04W 4/90 |
| 10,890,649 B2* | 1/2021 | Jarosinski | | G01S 7/4817 |
| 11,251,840 B1* | 2/2022 | Wen | | H04B 7/043 |
| 11,368,816 B2* | 6/2022 | Yerramalli | | G01S 5/0236 |
| 11,452,032 B2* | 9/2022 | Gupta | | H04W 4/021 |
| 11,463,859 B2* | 10/2022 | Cavendish | | H04W 4/50 |
| 11,595,801 B2* | 2/2023 | Cavendish | | H04W 4/06 |
| 11,632,737 B2* | 4/2023 | Prakash | | H04W 64/00 455/456.1 |
| 11,647,361 B2* | 5/2023 | Yerramalli | | H04W 64/006 455/456.1 |
| 11,653,292 B2* | 5/2023 | Azizi | | H04B 17/3913 370/329 |
| 11,800,439 B2* | 10/2023 | Azizi | | H04L 67/52 |
| 11,843,434 B2* | 12/2023 | Bshara | | H04B 7/0695 |
| 11,863,276 B2* | 1/2024 | Hirzallah | | H04B 17/101 |
| 11,914,046 B2* | 2/2024 | Hamilton | | G01S 17/931 |
| 12,127,103 B2* | 10/2024 | Azizi | | H04W 4/029 |
| 12,238,602 B2* | 2/2025 | Zhu | | G06N 5/01 |
| 12,244,994 B2* | 3/2025 | Visser | | H04S 7/30 |
| 12,245,037 B2* | 3/2025 | Kumar | | G08G 1/22 |
| 2006/0194553 A1* | 8/2006 | Ozaki | | H04W 24/00 455/226.1 |
| 2008/0129615 A1* | 6/2008 | Breit | | H04W 56/00 343/703 |
| 2010/0273433 A1* | 10/2010 | Ozaki | | H04B 17/327 455/67.11 |
| 2013/0231060 A1* | 9/2013 | Ozaki | | H04B 17/29 455/67.11 |
| 2019/0222267 A1* | 7/2019 | Lim | | H04B 7/0404 |
| 2019/0222275 A1* | 7/2019 | Mo | | H04B 7/0482 |
| 2019/0356397 A1* | 11/2019 | DaSilva | | G01R 1/045 |
| 2019/0364492 A1* | 11/2019 | Azizi | | H04W 4/024 |
| 2020/0037254 A1* | 1/2020 | Comsa | | H04W 52/367 |
| 2020/0205062 A1* | 6/2020 | Azizi | | H04W 4/46 |
| 2020/0266873 A1* | 8/2020 | Lim | | H04B 7/06966 |
| 2020/0322812 A1* | 10/2020 | Shi | | H04W 16/28 |
| 2020/0358498 A1* | 11/2020 | Mo | | H04B 7/0478 |
| 2020/0364187 A1* | 11/2020 | Tran | | G06N 3/02 |
| 2021/0105092 A1* | 4/2021 | Hajimiri | | H04B 7/0697 |
| 2021/0109145 A1* | 4/2021 | Haustein | | H04B 17/11 |
| 2021/0341572 A1* | 11/2021 | Hamberger | | G01S 7/4052 |
| 2021/0360432 A1* | 11/2021 | Mo | | H04B 7/086 |
| 2022/0190885 A1* | 6/2022 | Nakayama | | H04B 7/06 |
| 2023/0043667 A1* | 2/2023 | Ghosh | | H04W 74/002 |
| 2023/0085595 A1* | 3/2023 | Hirzallah | | H04B 7/0639 370/329 |
| 2023/0138578 A1* | 5/2023 | Azizi | | H04W 4/46 370/329 |
| 2023/0179953 A1* | 6/2023 | Hirzallah | | G01S 5/02521 455/456.2 |
| 2024/0073796 A1* | 2/2024 | Azizi | | H04L 67/51 |
| 2024/0088979 A1* | 3/2024 | Hirzallah | | H04B 7/088 |
| 2024/0171240 A1* | 5/2024 | Hirzallah | | H04W 74/0808 |
| 2024/0196431 A1* | 6/2024 | Hirzallah | | H04W 24/08 |
| 2024/0304990 A1* | 9/2024 | Tran | | H01Q 3/46 |
| 2025/0080382 A1* | 3/2025 | Aldana | | H04B 7/0632 |

OTHER PUBLICATIONS

International Search Report and Written Opinion—PCT/US2021/051390—ISA/EPO—Mar. 23, 2022.
Partial International Search Report—PCT/US2021/051390—ISA/EPO—Feb. 2, 2022.

* cited by examiner

DIVERGENCE STATISTICAL APPROACH FOR NARROW BEAM-BASED CHANNEL ACCESS

CROSS-REFERENCE TO RELATED APPLICATIONS

The present application is a 35 U.S.C. 371 National Phase entry of Patent Cooperation Treaty (PCT) Application No. PCT/US2021/051390, filed Sep. 21, 2021, which claims priority to Indian Provisional Patent Application No. 202121020672, filed May 6, 2021, titled "A DIVERGENCE STATISTICAL APPROACH FOR NARROW BEAM-BASED CHANNEL ACCESS," which is hereby incorporated by reference in its entirety as if fully set forth below and for all applicable purposes.

TECHNICAL FIELD

This application relates to wireless communication systems, and more particularly to narrow beam-based channel access for communications in a wireless communication network operating over an unlicensed spectrum.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mm Wave) bands. NR is also designed to operate across different spectrum types, from licensed spectrum to unlicensed and shared spectrum. Spectrum sharing enables operators to opportunistically aggregate spectrums to dynamically support high-bandwidth services, Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may listen to the channel to determine whether there are active transmissions in the channel. When the channel is idle, the transmitting node may transmit a preamble to reserve a transmission opportunity (TXOP) in the shared channel and may communicate with a receiving node during the TXOP. As use cases and diverse deployment scenarios continue to expand in wireless communication, channel access technique improvements may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a first wireless communication device may include receiving, from a second wireless communication device, one or more signals associated with a beam parameter. The method may further include determining, at each of a plurality of locations, a signal measurement for at least one received signal of the one or more received signals and determining, based at least in part on a cumulative distribution of the signal measurements at the plurality of locations and a reference probability distribution, whether the second wireless communication device satisfies an interference condition.

In an additional aspect of the disclosure, a method of wireless communication performed by a wireless communication device may include selecting a channel access configuration for transmitting a communication signal in an unlicensed frequency band using a transmission beam. The selecting may be based at least in part on a cumulative distribution of signal measurements and a reference probability distribution, wherein the signal measurements include one signal measurement at each of a plurality of locations. The method may further include transmitting, based on the channel access configuration and using the transmission beam, the communication signal in the unlicensed frequency band.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
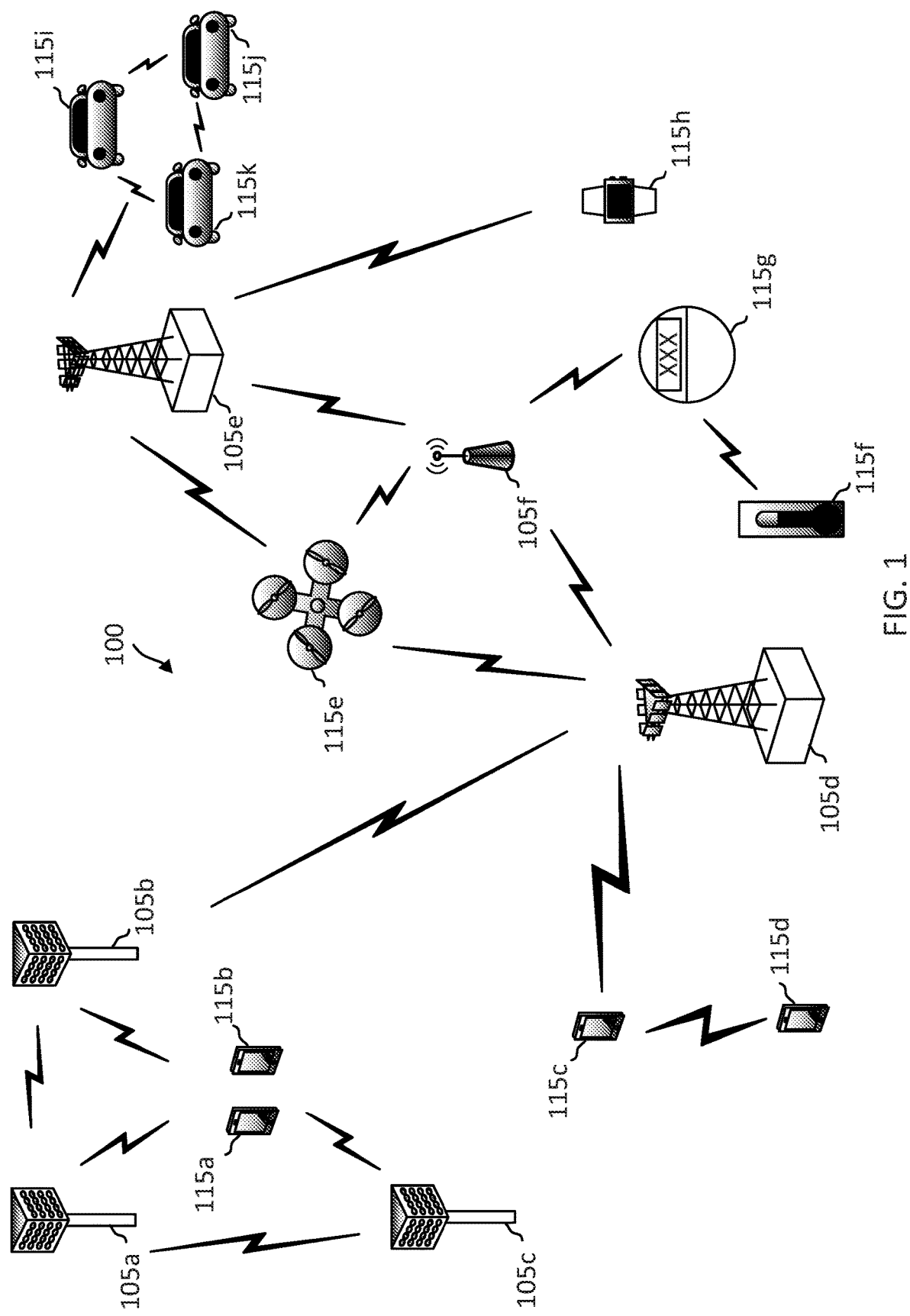
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2), These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MEM), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over $^{80}/_{100}$ MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into multiple different frequency ranges, a frequency range one (FR1), a frequency range two (FR2), and FR2x. FR1 bands include frequency bands at 7 GHz or lower (e.g., between about 410 MHz to about 7125 MHz). FR2 bands include frequency bands in mmWave ranges between about 24.25 GHz and about 52.6 GHz. FR2x bands include frequency bands in mm Wave ranges between about 52.6 GHz to about 71 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between LT and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

To enable coexistence among multiple devices in a shared or unlicensed spectrum, a listen-before-talk (LBT) procedure may be used to assess whether a shared channel is clear before transmitting a signal in the channel. During the LBT procedure, a device may perform a clear channel assessment (CCA) for a predetermined duration to contend for a channel occupancy time (COT). During the CCA, the device may compare the energy level detected in the channel to a threshold value. If the energy level exceeds the threshold, the device may determine that the channel is occupied, refrain from transmitting a signal in the channel, and repeat the CCA after a period of time, or the device may reduce its transmit power to avoid interfering with other devices that may be using the channel. If the energy level is below the threshold, the device may determine that the channel is unoccupied (indicating the device won the contention) and proceed with transmitting a signal in the COT.

The unlicensed spectrum that are available for wireless communications may include 5 gigahertz (GHz) bands, 6 GHz bands, and 60 GHz bands. One of the key driver for LBT in the 60 GHz bands is European Telecommunications Standards Institute (ETSI). To that end, in a first ETSI operating mode, a mobile or fixed wireless communication device or node is mandated to perform an LBT prior to accessing an unlicensed band in the 60 GHz range. However, performing an LBT prior to each and every transmission can be an inefficient use of resources as a result of the overhead and delays associated with the LBT. Further, a device or node communicating over a 60 GHz band is likely to use beamformed signals to compensate the high signal attenuation at the high frequency. A beamformed signal may focus its signal energy in a specific beam direction towards an intended receiver, and thus multiple transmitters can transmit at the same time in different spatial directions without interfering with each other or with a minimal interference. Accordingly, in a second ETSI operating mode (which is under studies for standardization), a mobile or fixed wireless communication device or node may transmit without performing an LBT if the device or node satisfies an interference condition or uses a certain antenna gain for the transmission. Antenna gain may be correlated to a transmission beam width. For example, a high antenna gain may produce a narrower beam than a lower antenna gain. That is, the second ETSI operating mode allows a device to skip LBT when a transmission is transmitted using a narrow transmission beam. While utilizing a high antenna gain to generate a narrow beam for transmission and/or reception can reduce the likelihood of collisions, beam collisions can occur and there is no detection or mitigation when LBT is simply skipped.

In some examples, a transmitting node may perform long-term sensing in addition to LBT to mitigate beam collision. For long-term sensing, a transmitting node may monitor for interferences in a shared channel over a long period of time, for example, across multiple transmission periods or COTs (e.g., at periodic measurement occasions) instead of performing sensing only when there is data ready for transmission. In further examples, a transmitting node may combine LBT and/or long-term sensing with other coexistence techniques, such as setting a limit to the beamwidth of a transmission beam, setting a limit for a transmit power, setting a limit for a duty cycle (e.g., a transmission to be within D % of total time), or setting a limit for beam dwell time (e.g., a maximum transmission duration along a certain beam direction) to further mitigate beam collision and/or interference.

As used herein, the term "transmission beam" may refer to a transmitter transmitting a beamformed signal in a certain spatial direction or beam direction and/or with a certain beam width covering a certain spatial angular sector. The transmission beam may have characteristics such as the beam direction and the beam width. The term "reception beam" may refer to a receiver using beamforming to receive a signal from a certain spatial direction or beam direction and/or within a certain beam width covering a certain spatial angular sector. The reception beam may have characteristics such as the beam direction and the beam width.

In certain aspects, a transmitting node may utilize one set of channel access procedures (e.g., without an LBT and/or long-term sensing) for channel access when the transmitting node utilizes a transmission beam that satisfies a narrow beam condition, and may utilize another set of channel access procedures for channel access when the transmitting node utilizes a transmission beam that fails to satisfy a narrow beam condition. That is, narrow-beam based channel access operates on the assumption that a narrow transmission beam may cause limited interference to surrounding nodes. Accordingly, it may be desirable to define a metric that tests for the narrowness of a transmission beam. The narrowness of a beam as discussed herein is in the context of interference. Accordingly, the narrowness of a beam may not be limited to the geometrical perspective (e.g., beam width) of the beam but may refer to the interference footprint of the beam on a network level. For instance, a fat or wide transmission beam (with a wide beamwidth) with a low gain and/or a low transmit power can be considered as narrow in terms of its interference to surrounding nodes.

The present disclosure provides techniques for determining whether a wireless communication device (e.g., a LT, a BS) satisfies an interference condition (e.g., a narrow beam condition) based on a comparison of a cumulative distribution of signal measurements of a transmission beam of the wireless device at a plurality of locations to a reference probability distribution. As will be described in detail with reference to FIGS. 5-9, the cumulative distribution of the signal measurements of the transmission beam of the wireless device may be based on signal measurements made at a number of locations associated with a spherical coverage of the wireless communication device (e.g., a device under test). For example, the location where the measurements are made may be associated with a respective azimuth angle and a respective elevation angle of the sphere with respect to the location and/or positioning of the wireless communication device within the sphere. The signal measurements may include determining an effective isotropic radiated power (EIRP) for the received signal at the locations on the sphere. Determining whether the transmission beam of the wireless device satisfies an interference condition may be achieved using any method. For example, determining whether the wireless communication device satisfies the interference condition may include determining whether a difference between a k-th percentile signal measurement of the signal measurements and a k-th percentile of the reference probability distribution satisfies a threshold. The reference probability distribution may satisfy a narrow beam condition and therefore satisfy the interference condition. In some instances, additional comparisons may be performed to determine whether the wireless communication device satisfies the interference condition. For example, determining whether a difference between the k-th percentile signal measurement of the signal and a k-th percentile of the reference probability distribution is less than a first threshold and determining whether a difference between a j-th percentile signal measurement of the signal measurements and a j-th percentile of the reference probability distribution is less than a second threshold. In this case, the value of k may be greater than a value of j.

In some instances, determining whether the wireless communication device satisfies the interference condition may be based on operating parameters and/or conditions of the wireless device. For example, the comparison thresholds and/or the reference probability distribution may be based on operating parameters (e.g., frequency of operation, mobility conditions, type of wireless devices, device power class, class of services, interference conditions, etc.) and conditions (e.g., density of wireless devices in the area of the wireless device).

Additionally or alternatively, the criteria for satisfying an interference condition (e.g., a narrow beam metric) may be based on a divergence metric. The narrow beam metric, say for beam j, may be defined as the divergence metric between C_j (the CDF of signal measurements made while the transmitter is configured with beam j) and the R_cdt (the reference CDF). The divergence metric may include, without limitation, a Kullback-Liebler divergence measure, a Wasserstein distance, a normalized difference in mean, a normalized difference in variance, a difference in energy, a Jensen-Shannon divergence measure, a Hellinger distance, a Bhattacharyya distance, a correlation coefficient, etc. The divergence metric may be represented as M_j=div.metric (C_j,R_cdf) in which the wireless device satisfies the interference condition if M_j is less than a predefined threshold, say d_2. In some instances, the thresholds may be considered as a target distance that relates to the maximum tolerable interference level. In some instances, the thresholds may be based on parameters and/or operating conditions of the wireless device.

Aspects of the present disclosure can provide several benefits. For example, if a wireless device satisfies the inference condition, the probability that the wireless device will interfere with other nodes (e.g., other wireless devices) in the area may be reduced. The interference may be low enough (under a threshold) such that the wireless device may implement channel access methods that reduces latency and overhead. For example, if the wireless device satisfies the inference condition, the wireless device may refrain from performing an LBT and/or long-term sensing before accessing the channel.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. ABS 105 may be a station that communicates with UEs 115 (individually labeled as 115a, 11.5b, 115c, 115d, 115e, 11.5f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). ABS for a macro cell may be referred to as a macro BS. ABS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MLN IO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. ABS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a LIE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support time-stringent communications with ultra-reliable and redundant links for time-stringent devices, such as the UE 115e. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and LIE, 115h (e.g., wearable device) may communicate through the network 100 either directly with BSs, such as the small cell BS 105f, and the macro BS 1.05e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a LIE, 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the NUB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PDSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the TIE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the LIE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the LIE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UT, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the LE 115's location to the network 100 when entering a new TA. The TAU allows the network 100 to quickly locate the UE 115 and page the LIE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (113). If the UE 115 receives the DL data packet successfully, the UE 115 may transmit a HARQ ACK to the BS 105. Conversely, if the LIE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWF. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the MVP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the LTEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as COT. The goal of LBT is to protect reception at a receiver from interference. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold, A CAT4 LBT refers to an LBT with a random backoff and a variable contention window (CW). For instance, a transmitting node may draw a random number and backoff for a duration based on the drawn random number in a certain time unit.

In some aspects, the network 100 may operate over a mmWave band (e.g., at 60 GHz). Due to the high pathloss in the mmWave band, the BSs 105 and the UEs 115 may utilize directional beams to communicate with each other. For instance, a BS 105 and/or a UE 115 may be equipped with one or more antenna panels or antenna arrays with antenna elements that can be configured to focus transmit signal energy and/or receive signal energy in a certain spatial direction and within a certain spatial angular sector or width. In general, a BS 105 and/or a UE 115 may be capable of generating a transmission beam for transmission or a reception beam for reception in various spatial direction or beam directions.

Figure 2:
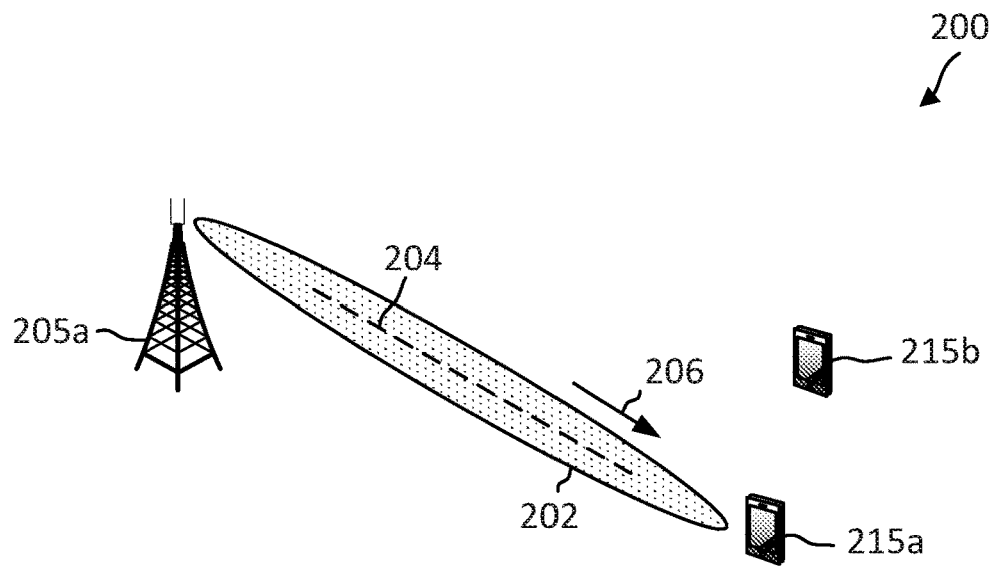
FIG. 2 illustrates a communication scenario according to some aspects of the present disclosure.

FIG. 2 illustrates a communication scenario 200 according to aspects of the present disclosure. The communication scenario 200 may correspond to a communication scenario among BSs 105 and or UEs 115 in the network 100. For simplicity, FIG. 2 illustrates one BS 205 and two UEs 215 (shown as 215a and 215b), but a greater number of UEs 215 (e.g., the about 3, 4, 3, 6, 7, 8, 9, 10, or more) and/or BSs 205 (e.g., the about 2, 3, 4 or more) may be supported. The BS 205 and the UEs 215 may be similar to the BSs 105 and the UEs 115, respectively.

In the scenario 200, the BS 205 may serve the UE 215a. In some instances, the UE 215b may be served by the BS 205. In other instances, the UE 215b may be served by another BS (e.g., another BS 105 or 205). In such instances, the UE 215b and the other BS can be operated by the same network operating entity as the BS 205 or a different network operating entity than the BS 205 Further, in some instances, the UE 215b and the other BS may utilize the same RAT as the BS 205 and the UE 215a. In other instances, the UE 215b and the other BS may utilize a different RAT than the BS 205 and the UE 215a. For instance, the BS 205 and the UE 215a may be NR-U devices, and the other BS and the UE 215b may be WiFi devices. NR-U may refer to the deployment of NR over an unlicensed spectrum.

The BSs 205 and the UEs 215 may communicate over a mmWave band. The mmWave band may be at any mmWave frequencies (e.g., at 20 GHz, 30 GHz, 60 GHZ or higher). As explained above, the high mmWave frequencies can have a high pathloss, and a device operating over such frequencies may use beamforming for transmission and/or reception to compensate the high signal attenuation. For instance, the BS 205 may be capable of generating a number of directional transmission beams in a number of beam or spatial directions (e.g., about 2, 4, 8, 16, 32, 64, or more) and may select a certain transmission beam or beam direction to communicate with the UE 215a based on the location of the UE 215a in relation to the location of the BS 205 and/or any other environmental factors such as scatterers in the surrounding. For example, the BS 205s may select a transmission beam that provides a best quality (e.g., with the highest receive signal strength) for communication with the UE 215a. The UE 215a may also be capable of generating a number of directional transmission beams in a number of beam or spatial directions (e.g., about 2, 4, 8, or more) and may select a certain transmission beam that provides the best quality (e.g., with the highest receive signal strength) to communicate with the BS 205a. In some instances, the BS 205 and the UE 115a may perform a beam selection procedure with each other to determine a best UL beam and a best DL beam for communications. Similarly, each of the BS 205b and the UE 215b may be capable of generating a number of directional transmission beams in a number of beam directions or spatial directions and may select a most suitable or best transmission beam or beam direction to communicate with each other.

In the illustrated example of FIG. 2, the BS 205 may transmit a transmission to the UE 215a using a transmission beam 202 in a direction 206 along a line-of-sight (LOS) path 204, and the UE 215a may use a reception beam in the reverse direction (of the direction 206) to receive the transmission. The BS 205b may transmit a transmission to the UE 215b using a transmission beam 212 in a direction 216 along a LOS path 214, and the UE 215b may use a reception beam in the reverse direction (of the direction 216) to receive the transmission. Each of the transmission beam 202 and the transmission beam 212 may be narrow transmission beams.

As explained above, narrow beam transmissions can be used as a coexistence mechanism for spectrum sharing since the transmission beam may focus the transmission signal energy in a specific beam direction, and thus may be less likely to interfere with transmissions and/or receptions of neighboring devices.

Figure 3:
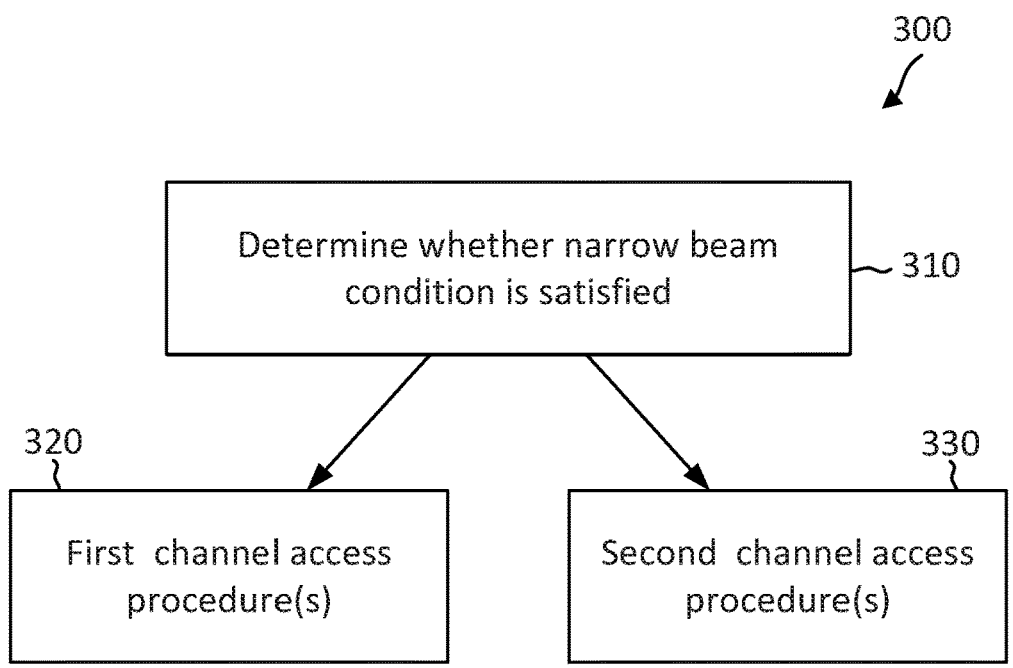
FIG. 3 illustrates a channel access method according to some aspects of the present disclosure.

FIG. 3 illustrates a channel access method 300 according to some aspects of the present disclosure. The method 300 may be employed by BSs such as the BSs 105 and/or 205 and/or UEs such as the UEs 115 and/or 215. In particular, a wireless communication device (e.g., a BS or a LIE) may determine which channel access procedure(s) to use for channel access in an unlicensed band, for example, in the mmWave range or sub-THz range, using the method 300.

At block 310, a wireless communication device (e.g., a BS 105, 205 or a UE 115, 215) may determine whether a narrow beam condition is satisfied. For instance, the wireless communication device may determine whether a beam characteristic of a transmission beam to be used for an upcoming transmission satisfies (e.g., less than) a certain threshold. For example, techniques for determining whether a wireless communication device (e.g., a BS 105, 205 or a LIE 115, 215) satisfies an interference condition (e.g., a narrow beam condition) may be based on a comparison of a cumulative distribution of signal measurements of a transmission beam of the wireless device to a reference probability distribution. In some aspects, the wireless communication device may determine whether a beam width (e.g., a half-power beam width) of the beam satisfies a threshold. Additionally or alternatively, the wireless communication device may determine whether a transmit power of the beam satisfies a threshold. Additionally or alternatively, the wireless communication device may determine whether a beam dwell time or a duty cycle of the beam satisfies a threshold. For instance, the transmission beam may satisfy the narrow beam condition if the beam width is less than a certain threshold, if the transmit power is less than a certain threshold, and/or if the beam dwell time is less than a certain threshold. Conversely, the transmission beam may fail to satisfy the narrow beam condition if the beam width exceeds a certain threshold, if the transmit power exceeds a certain threshold, and/or if the beam dwell time exceeds a certain threshold.

At block 320, if the narrow beam condition is satisfied, the wireless communication device may utilize a first set of channel access procedures. In some aspects, the first set of channel access procedures may include a channel access without performing an LBT and/or long-term sensing. In some aspects, the first set of channel access procedures may also include various restrictions on the transmission power, the transmission duty cycle, and/or the beam dwell time that the wireless communication device may use.

If, however, the narrow beam condition is not satisfied, the wireless communication device may proceed to block 330. At block 330, the wireless communication device may utilize a second set of channel access procedures. In some aspects, the second set of channel access procedures may include a channel access after a successful LBT and/or a low interference detection from long-term sensing. In some aspects, the first set of channel access procedures may also include various restrictions on the transmission power, the transmission duty cycle, and/or the beam dwell time that the wireless communication device may use.

While utilizing the narrow beam condition as in the method 300 can reduce the likelihood of the beam collision, in some instances, a transmission beam may include main lobes and side lobes. For instance, a directional antenna array or elements may have an objective to emit a transmission beam (RF signal waves) in a specific direction. However, a directional antenna array or elements may also generate unwanted or undesired radiation in directions other than the specific direction (the intended direction). That is, the transmission beam may have a main lobe in the specific direction and side lobe(s) in other directions. The main lobe is configured to have a large field strength than the other side lobe(s). Accordingly, a transmission beam can cause interference in directions other than the specific direction that the transmission beam is directed to as will be discussed below in FIG. 4.

Figure 4:
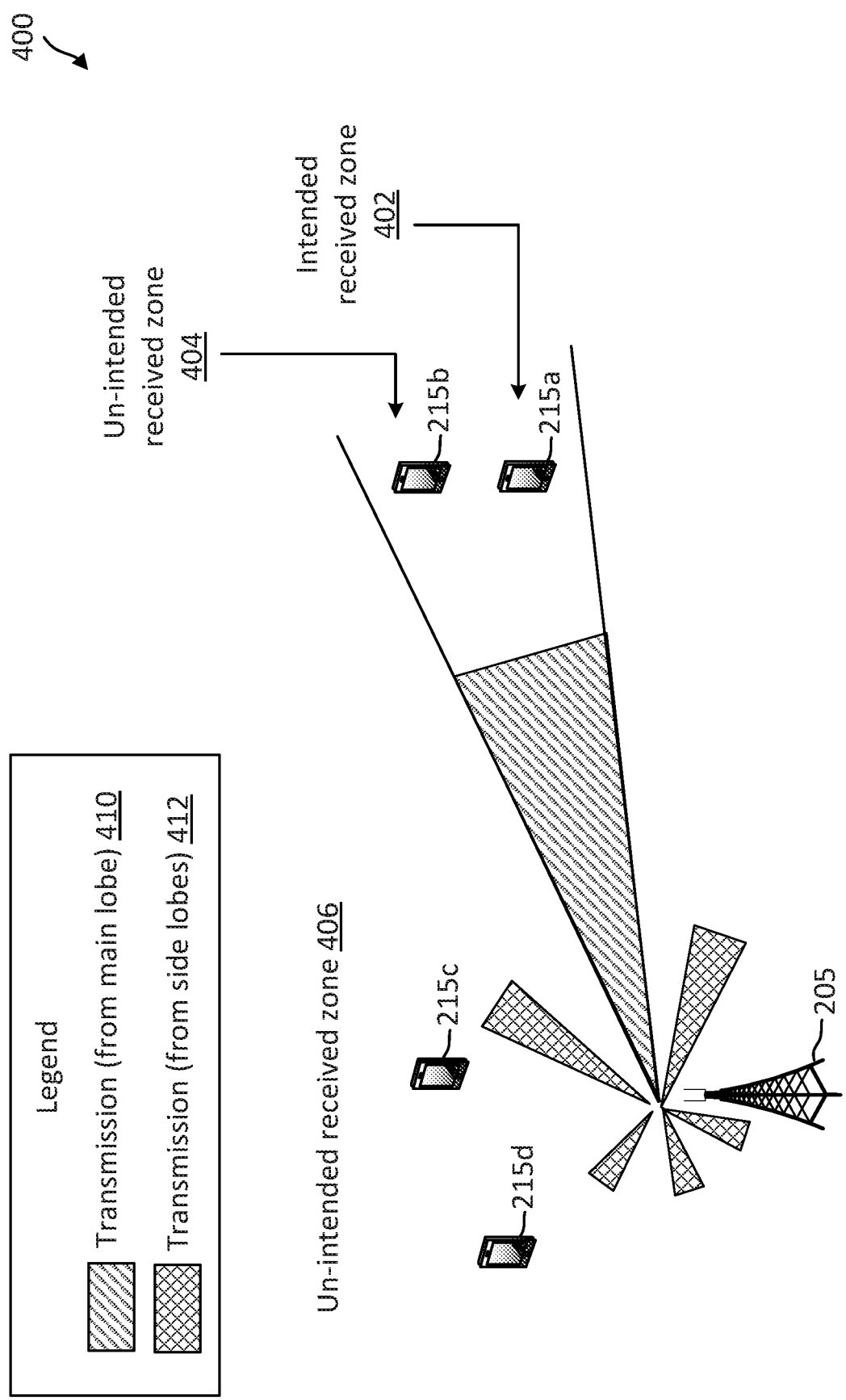
FIG. 4 illustrates a communication scenario according to some aspects of the present disclosure.

FIG. 4 illustrates a communication scenario 400 according to some aspects of the present disclosure. The communication scenario 400 may correspond to a communication scenario among BSs 105 and or UEs 115 in the network 100. For simplicity, FIG. 4 illustrates one BS 205 and four UEs 215 (shown as 215a, 215b, 215c, and 215d), but a greater number of UEs 215 (e.g., about 3, 4, 5, 6, 7, 8, 9, 10, or more) and/or BSs 205 (e.g., about 2, 3, 4, Of more) may be supported. The BS 205 and the UEs 215 may be similar to the BSs 105 and the UEs 115, respectively.

The scenario 400 provides further illustration of interference in the communication scenario 200, where the BS 205 utilizes transmit beamforming to communicate with the UE 215a. As shown in FIG. 4, a transmission beam (e.g., the transmission beam 202) from the BS 205 directing to the UE 215a may include a main lobe and side lobes. The transmission from the main lobe is shown by the stripe-pattern filled shapes and may be referred to as transmission 410. The transmission from the side lobes is shown by the criss-cross pattern filled shapes and may be referred to as transmission 412. The transmission 410 from the main lobe may reach an intended receive OW zone 402 at a far field where the UE 215a (the intended receiver) is located. Moreover, the transmission 410 from the main lobe may also reach an unintended receive (Rx) zone 404 at a far field where the UE 215b (an unintended receiver) is located. Further, the transmission 412 from the side lobes may reach an unintended receive (Rx) zone 406 where the UEs 215c and 215d (unintended receivers) are located.

While FIG. 2 and FIG. 4 illustrate the BS 205 utilizing a single transmission beam 202 to communicate with the UE 215a (a single user), aspects are not limited thereto. In general, a BS 205 may utilize analog and; or digital beamforming to communicate with a UE 215 in a variety of configurations. For example, in some scenarios, a BS 205 may transmit a single data stream over a single transmission beam to a single UE 215. In some scenarios, a BS 205 may transmit multiple data streams over a single transmission beam to a single LIE 215, for example, in a single user-multiple-input-multiple-output (SU-MIMO) configuration. In some scenarios, a BS 205 may transmit multiple data streams over a single transmission beam, where each data stream is for a different UE 215, for example, in a multiple user-multiple-input-multiple-output (MU-"HMO) configuration. In some scenarios, a BS 205 may transmit a single data stream over multiple transmission beams to a single UE 215. In some instances, a BS 205 may transmit multiple data streams over multiple transmission beams to a single UEs 215 (in a SU-MIMO configuration) In some scenarios, a BS 205 may transmit multiple data streams over multiple transmission beams to multiple UEs 215, where each UE 215 may receive one or more of the data streams (in a MU-MIMO configuration).

Depending on the strength or the transmit power of the transmission beam, the geometry of the main lobe and/or side lobes of the transmission beam, and/or the interference tolerance levels of the UEs (e.g., the UEs 215b, 215c, and/or 215d) located in the unintended receive zones (e.g., the zones 404 and 406), the transmission beam can interfere and degrade communications of those UEs in the unintended receive zones. Accordingly, the narrowness of a beam footprint in the context of interference may consider not only the specific direction from the main lobe, but rather in all spatial directions including the side lobes.

As discussed above, wireless devices such as the BSs 105 and 205 and UEs 115 and 215 may apply analog and/or digital beamforming to direct an RF transmission in a direction towards a target receiver. Directing an RF transmission beam towards a specific direction may require narrowing the width of the beam. In some instances, narrowing the beam width may reduce interference to wireless devices outside the beam. FIGS. 5-8 below describe methods of measuring an RF transmission beam width. The width of the RF beam may determine the methods used by the wireless device to access the wireless channel.

Figure 5:
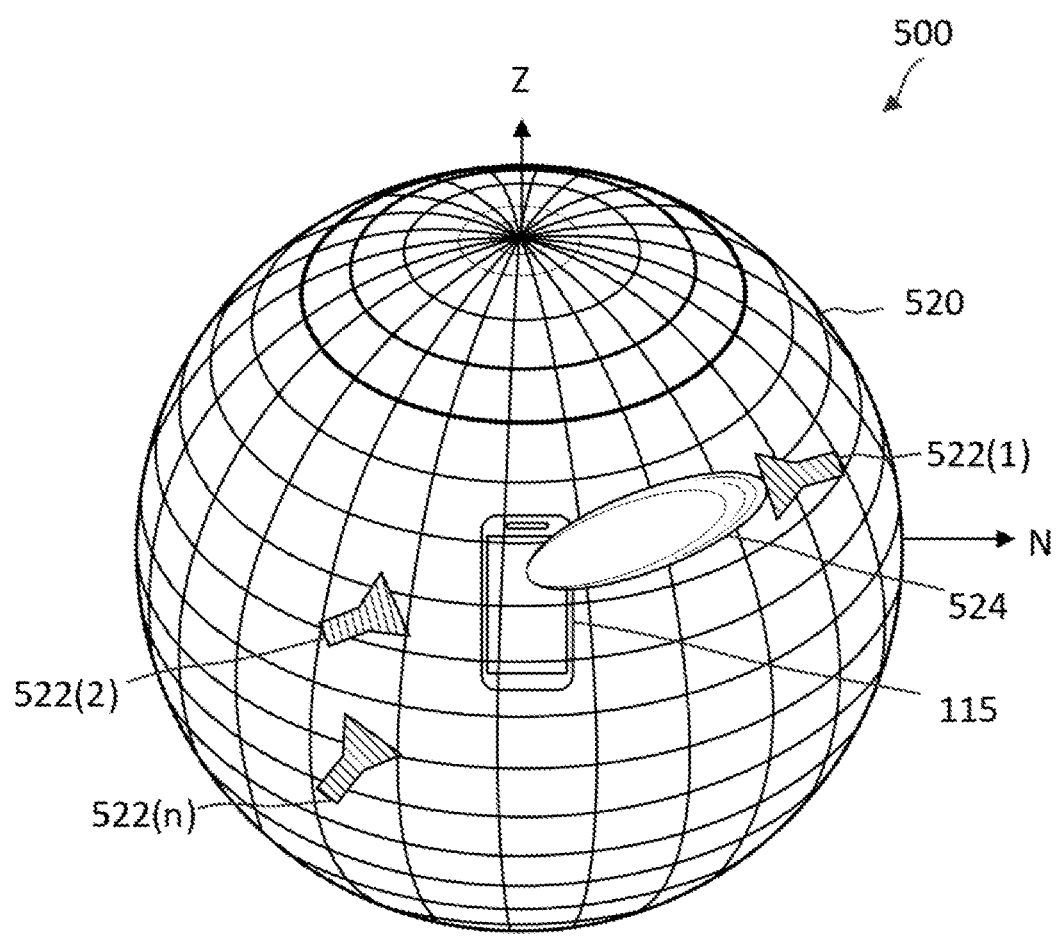
FIG. 5 illustrates a direct far field (DFF) measurement setup of a wireless device according to some aspects of the present disclosure.

FIG. 5 illustrates a direct far field (DFF) measurement setup 500 of a wireless device according to some aspects of the present disclosure. The measurement setup 500 may be employed by BSs such as the BSs 105, 205 and UEs such as the UEs 115, 215 in a network such as the network 100 for communications. The description of measurement setup 500 described below is directed to measuring RF radiated from a device under test (DUT) such as the UEs 115, 215. However, the present disclosure is not so limited and the measurement setup 500 may be applied to any wireless device. For example, the measurement setup 500 may be applied to the BSs 105, 205. The measurement setup 500 may be applied to measuring a transmission beam 524 generated by the UE 115. For example, the measurement setup 500 may measure the effective isotropic radiated power (EIRP) of the transmission beam 524 at multiple spatial locations with respect to the UE 115. In some instances, the EIRP may be measured according to the methods described in 3GPP specification TR 38.810.

In some instances, the measurement setup 500 may be configured as a sphere 520 as shown in FIG. 5. The measurement setup 500 may include a number of RF sensors (e.g., receive antennas and RF processors) 522(1) ... 522(n) that are configured at a set of locations on sphere 520 to measure the EIRP (e.g., RF energy) radiated from the UE 115. As will be described in detail with reference to FIGS. 6 and 7 below, RF sensors 522(1) ... 522(n) may be located (e.g., spatially distributed) on the sphere 520 using different spacing configurations. In some aspects, RF sensors 522(1) ... 522(n) may include an array of discrete receive antennas and RF processors arranged in a sphere 520. In other aspects, RF sensors 522(1) ... 522(n) may include an array of discrete receive antenna, RF frontends, and processors. In some instances, the RF sensors 522(1) ... 522(n) may be part of a wireless device such as BSs 105, 205 or UEs 115, 215. The RF sensors 522(1) ... 522(n) may record measurements of signals associated with transmission beam 524. The recorded measurements may be processed to determine whether the TIE 115 satisfies an interference condition based on the recorded signal measurements. Each of the measurements may be recorded at a location on the sphere 520. For example, each of the locations may be defined by an azimuth angle with respect to axis N and an elevation angle with respect to axis Z.

Figure 6A:
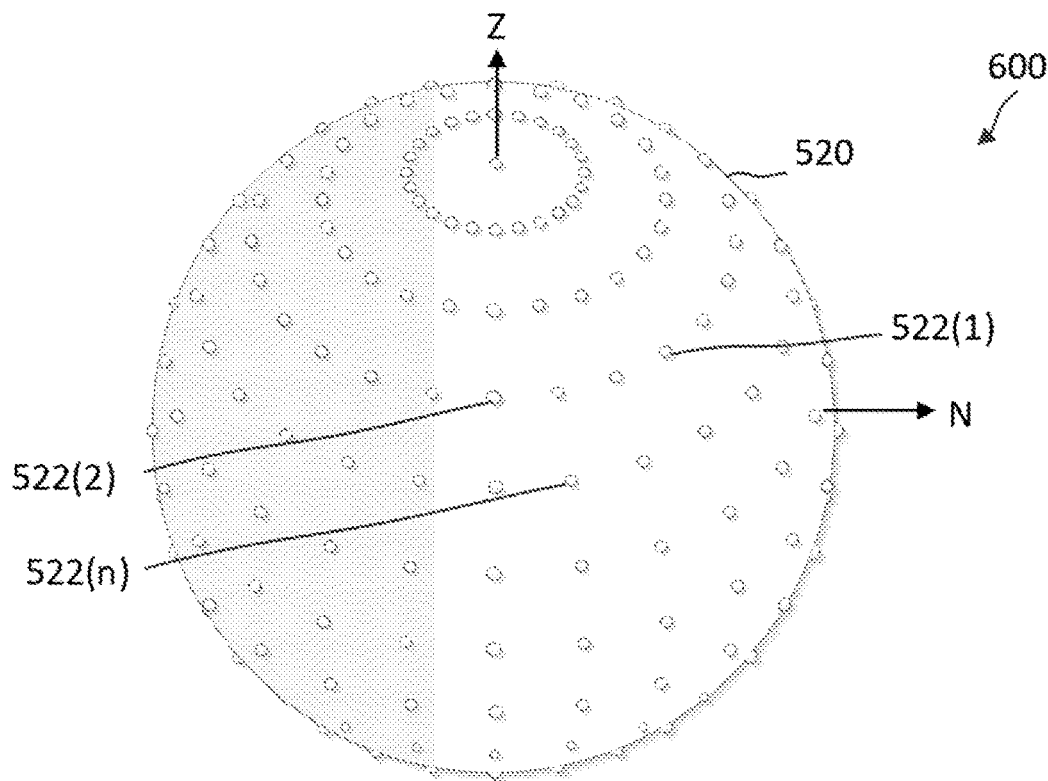
FIGS. 6A-6B illustrates a DFF measurement setup of a wireless device according to some aspects of the present disclosure.

FIG. 6A illustrates a direct far field (DFF) measurement setup 600 of a wireless device according to some aspects of the present disclosure. The measurement setup 600 may be employed by BSs such as the BSs 105, 205 and UEs such as the UEs 115, 215 in a network such as the network 100 for communications. The description of measurement setup 600 described below is directed to measuring RF radiated from a device under test (DUT) such as the UEs 115, 215. However, the present disclosure is not so limited and the measurement setup 600 may be applied to any wireless device. For example, the measurement setup 600 may measure the EIRP of the transmission beam 524. In some instances, the measurement setup 600 may be spatially configured as a sphere 520 as shown in FIG. 6A. The measurement setup 600 may include a number of RF sensors (e.g., receive antennas and RF processors) 522(1) ... 522(n) that are configured at a set of locations to measure the RF energy radiated from the wireless device.

Figure 6B:
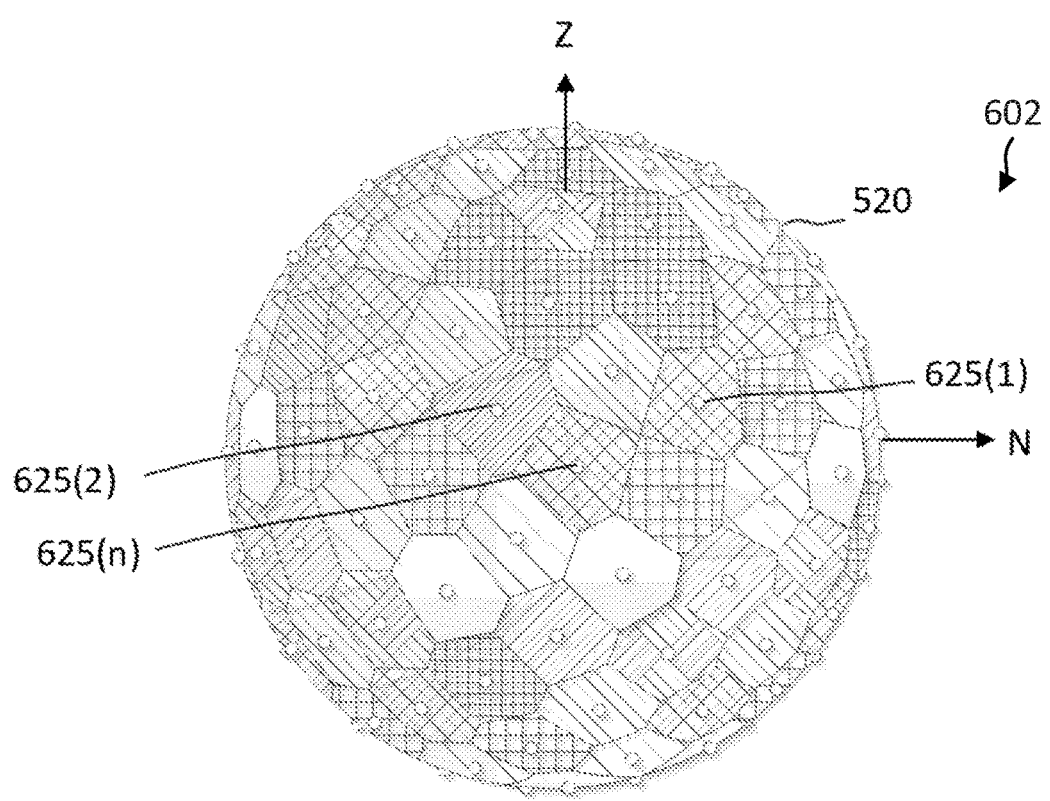

RF sensors 522(1) ... 522(n) may be located on (e.g., distributed across) the surface of the sphere 520 in any spatial configuration. RF sensors 522(1) ... 522(n) may include an array of discrete receive antennas and RF processors arranged in a sphere 520. Each of the measurements may be recorded at a location on the sphere 520. For example, each of the locations may be defined by an azimuth angle with respect to axis N and an elevation angle with respect to axis Z (e.g., discrete elevation angles, each elevation angle defining the plane). In the embodiment of FIG. 6B, the constant step size grid has the azimuth and elevation angles uniformly distributed. For example, the RF sensors 522(1) ... 522(n) may be distributed in a uniform planar manner (e.g., constant step size) such that for each of the configured planes (X-N planes) along the Z axis. RF sensors 522(1) ... 522(n) may be located within each configured plane (each configured plane having the same elevation angle) and having a different azimuth angle. The difference in the azimuth angle between RF sensors 522(1) ... 522(n) may be the same (e.g., evenly spaced). In some instances, the RF sensors 522(1) ... 522(n) may be part of a wireless device such as a BS 105, 205. The RF sensors 522(1) ... 522(n) may record measurements (e.g., EIRP) of signals associated with a transmission beam (e.g., transmission beam 524). The recorded measurements may be processed to determine whether the wireless device (e.g., UE 115) satisfies an interference condition based on the recorded signal measurements.

FIG. 6B illustrates a direct far field (DFF) measurement setup 602 of a wireless device according to some aspects of the present disclosure. The measurement setup 602 may be employed by BSs such as the BSs 105, 205 and UEs such as the UEs 115, 215 in a network such as the network 100 for communications. The description of measurement setup 602 is directed to measuring RF radiated from a device under test (DUT) such as UEs 115, 215. However, the present disclosure is not so limited and the measurement setup 602 may be applied to any wireless device. For example, the measurement setup 602 may be applied to BSs 105, 205. For example, the measurement setup 602 may measure the EIRP of the transmission beam 524. In some instances, the measurement setup 602 may be configured as a sphere 520 as shown in FIG. 6B. The measurement setup 602 may include a number of RF sensors (e.g., receive antennas and RF processors) 522(1) ... 522(n) that are configured at a set of locations to measure the RF energy radiated from the UE 115, Tiles 625(1) ... 625(n) may represent the tiles (e.g., regions) within which RF sensors 522(1) ... 525(n) respectively measure the RF parameters associated with the transmission beam (e.g., transmission beam 524) radiated from the wireless device. Tiles 625(1) ... 625(n) may be shaped as polygons and configured as Voronoi regions.

Figure 7A:
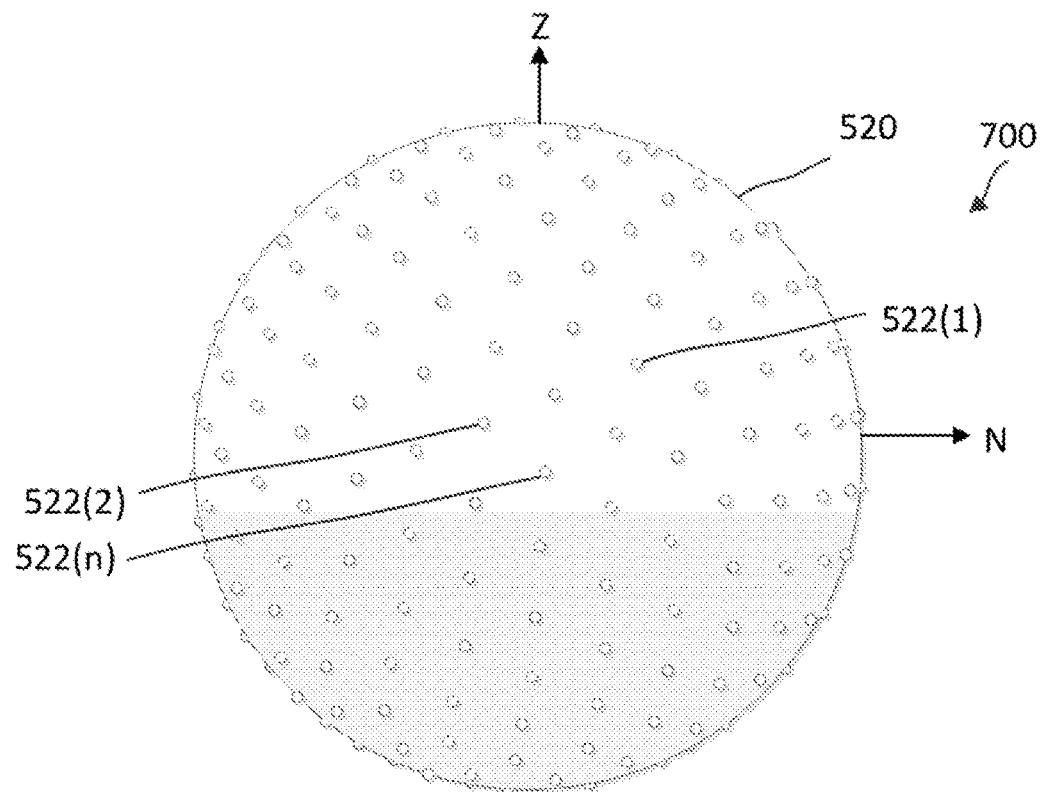
FIGS. 7A-7B illustrates a DFF measurement setup of a wireless device according to some aspects of the present disclosure.

FIG. 7A illustrates a direct far field (DFF) measurement setup 700 of a wireless device according to some aspects of the present disclosure. The measurement setup 700 may be employed by BSs such as the BSs 105, 205 and UEs such as the UEs 115, 215 in a network such as the network 100 for communications. The description of measurement setup 700 described below is directed to measuring RF radiated from a device under test (DUT) such as UEs 115, 215. However, the present disclosure is not so limited and the measurement setup 700 may be applied to any wireless device. For example, the measurement setup 700 may be applied to BSs 105, 205, For example, the measurement setup 700 may measure the EIRP of the transmission beam 524. In some instances, the measurement setup 700 may be spatially configured as a sphere 520 as shown in FIG. 7A. The measurement setup 700 may include a number of RF sensors (e.g., receive antennas and RF processors) 522(1) ... 522(n) that are configured at a set of locations to measure the RF energy radiated from the UE 115.

RF sensors 522(1) . . . 522(n) may be located on (e.g., distributed across) the surface of the sphere 520. The measurement setup 700 may be configured similar to the measurement setup 600 with the difference being the arrangement in the location of the RF sensors 522(1) . . . 522(n). In contrast to the arrangement in FIG. 6A in which RF sensors 522(1) . . . 522(n) are arranged in a uniform planar manner such that for each plane in the Z axis, RF sensors 522(1) . . . 522(n) may be located within each plane having the same elevation angle and having a different azimuth angle, in FIG. 7A, the RF sensors 522(1) . . . 0.522(n) are arranged equidistant to one another on the surface of the sphere 520. The equidistant arrangement of the RF sensors 522(1) . . . 522(n) in FIG. 7A may provide a more uniform measurement of the transmission beam within the sphere 520.

Figure 7B:
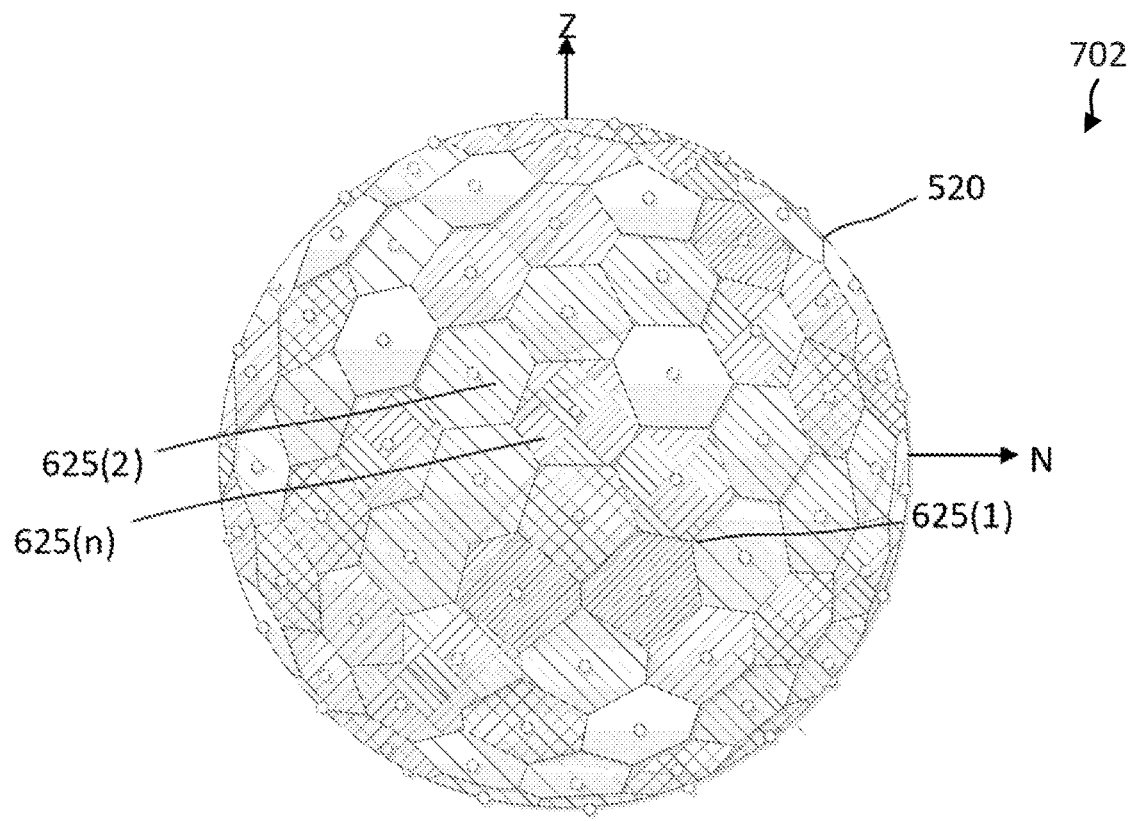

FIG. 7B illustrates a direct far field (DFF) measurement setup 702 of a wireless device according to some aspects of the present disclosure. The measurement setup 702 may be employed by BSs such as the BSs 105, 205 and UEs such as the UEs 115, 215 in a network such as the network 100. The measurement setup 702 may be configured similar to the measurement setup 602 with the difference being the arrangement in the location of the RF sensors 522(1) . . . 522(n). In contrast to the arrangement in FIG. 6B, in FIG. 7B the RF sensors 522(1) . . . 522(n) are arranged equidistant to one another. Consequently, the tiles 625(1) . . . 625(n) that represent the regions within which RF sensors 522(1) . . . 525(n) respectively measure the RF parameters may be arranged according to the equidistant spacing of the RF sensors 522(1) . . . 525(n). Tiles 625(1) . . . 625(n) in FIG. 7B may also be shaped as polygons and configured as Voronoi regions.

Figure 8:
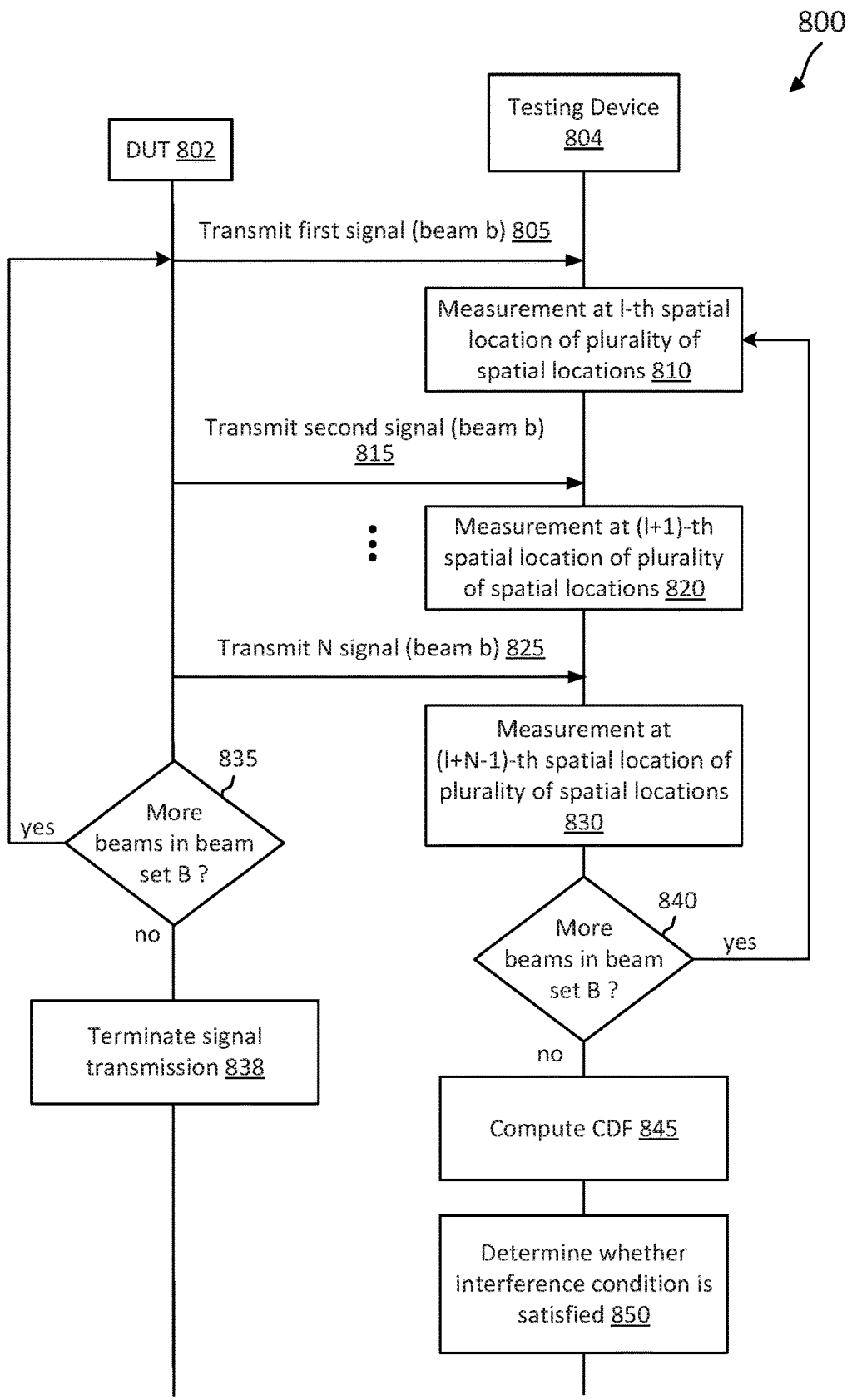
FIG. 8 is a sequence diagram illustrating a narrow beam interference testing method according to some aspects of the present disclosure.

FIG. 8 is a sequence diagram illustrating a narrow beam interference testing method 800 according to some aspects of the present disclosure. The method 800 may be implemented between a testing device 804 and a device under test (DUT) 802. In some aspects, the testing device 804 may be a wireless communication device testing equipment, and the DUT 802 may be a BS similar to the BS 105 and/or 205 or a UE similar to the UEs 115 and/or 215. In other aspects, the testing device 804 may be a BS similar to the BS 105 and/or 205, and the DUT 802 a UE similar to the UEs 115 and/or 215. In some aspects, the method 800 may be implemented in conjunction with the measurement setups 500, 600, 602, 700, and/or 702 discussed above with reference to FIGS. 5, 6A, 6B, 7A, and/or 7B. In some aspects, the testing device 804 may be similar to the BS 1100 of FIG. 11 and may utilize one or more components, such as the processor 1102, the memory 1104, the interference module 1108, the transceiver 1110, the modem 1112, and the one or more antennas 1116 with reference to FIG. 11, to execute the actions of the method 800. In other aspects, the DUT 802 may be similar to the wireless communication device 1200 of FIG. 12 and may utilize one or more components, such as the processor 1202, the memory 1204, the interference module 1208, the transceiver 1210, the modem 1212, and the one or more antennas 1216 with reference to FIG. 12, to execute the actions of the method 800. As illustrated, the method 800 includes a number of enumerated actions, but aspects of the method 800 may include additional action(s) before, after, and in between the enumerated action. In some aspects, one or more of the enumerated actions may be omitted or performed in a different order.

At action 805, the DUT 802 transmits, and the testing device 804 receives, one or more signals associated with a beam parameter. The DUT 802 may transmit the one or more signals using a certain transmission beam. The beam param-eter may be denoted as j, representing a certain beam characteristic such as a beam direction. That is, the DUT 802 transmits the one or more signals using a transmission beam J. For instance, the DUT 802 may transmit a first signal of the one or more signals using the transmission beam j, transmit a second signal of the one or more signals using the same transmission beam j, and so on. In some instances, the transmission beam j may be similar to the transmission beam 202 discussed above with reference to FIG. 2, the transmission beam with the main lobe and side lobes discussed above with reference to FIG. 4, or the transmission beam 524 discussed above with reference to FIG. 5. The transmission beam j may be from a set of beams, denoted as B, each having a different beam characteristic (e.g., each beam with a different beam direction having a different azimuth angle and/or a different elevation angle). The set of beams B may have N number of beams (e.g., beam 1, beam 2, . . . , beam N). In some aspects, the DUT 802 may generate the set of transmissions beams B based on a beam codebook. The beam codebook may include various beamforming parameters, for example, including phase parameters and/or gain parameters for configuring antenna panel(s), antenna array(s), and/or antenna elements at the DUT 802 to generate the set of transmissions beams B. The one or more signals may include any suitable beam measurement signals, such as CSI-RSs, SSBs, and/or any predetermined waveform signals that can facilitate receive signal measurements (e.g., EIRPs) at the testing device 804.

In response to receiving the one or more signals from the DUT 802, the testing device 804 may determine, at each location of a plurality of locations, a signal measurement for at least one received signal of the one or more received signals. Each measurement location of the plurality of locations may be at a certain elevation angle, represented by θ, and a certain azimuth angle, represented by (I), with respect to the DUT 802. In some aspects, the plurality of locations may be associated with a spherical coverage of the DUT 802. In this regard, the DUT 802 may be positioned at a certain location and the plurality of locations may be distributed across a surface of a spherical space (e.g., the sphere 520) enclosing the DUT 802, for example, similar to the measurement setup 500 discussed above with reference to FIG. 5. The plurality of locations may be arranged in a wide variety of arrangements. In some aspects, the plurality of locations may be planar uniform as shown in FIGS. 6A-6B. In other aspects, the plurality of locations may be spherical uniform as shown in FIGS. 7A-7B.

In general, the plurality of locations may be arranged in any suitable manner. For example, the plurality of locations may be spaced apart from each other by any suitable distances (e.g., uniformly or non-uniformly). That is, the elevation angles and/or the azimuth angles for the plurality of locations can have any suitable granularities or step size. Further, the plurality of locations may cover any suitable angular spatial sector of the DUT 802. That is, the plurality of locations may be defined with azimuth angles and/or elevation angles in any suitable range. For instance, in some aspects, the plurality of locations may be distributed within a certain spatial sector of interest to the operations of the DUT 802. As an example, when the DUT 802 is a BS such as the BS 105 or 205, and the BS is to be for deployment in an area covered by three cells, the plurality of locations for the signal measurements may be within −60 degrees to +60 degrees in the azimuth direction based on the field of view of a cell served by the BS. In some aspects, the range and/or granularity of measurements in terms of angular azimuth and elevation directions can be determined based on regulation on the frequency band of operations or any other suitable operating parameter associated with the DUT 802.

In some aspects, the testing device 804 may include RF sensors or transmission-reception points (TRPS) that are positioned at the plurality of locations. Accordingly, the testing device may measure a signal received from the DUT 802 at each of the plurality of locations at the same time. In other aspects, the testing device 804 may be repositioned to a different location of the plurality of locations for each measurement. In such a test setup, the DUT 802 may transmit the same signal repeatedly using the same transmission beam so that the testing device 804 may determine a signal measurement at each location of the plurality of locations.

As shown, at action 810, the testing device 804 determines and records a signal measurement for at least one of the one or more received signals at a first location of the plurality of locations. The signal measurement may be a received signal power or an EIRP of at least one of the one or more received signals. As explained above, each of the plurality of locations may have a certain elevation angle $\theta$ and a certain azimuth angle $\phi$ with respect to the DUI 802. Thus, the signal measurement at the first location can be represented by $R\_(\phi(1),\theta(1))$ or simplified to $R\_1$.

At action 820, the testing device 804 determines and records a signal measurement for at least one of the one or more received signals at a second location of the plurality of locations. The signal measurement may be a received signal power or an EIRP of at least one of the one or more received signals. The signal measurement at the second location can be represented by $R\_(\phi(2),\theta(2))$ or simplified to $R\_2$.

The testing device 804 may continue to determine, at each of the plurality of locations, a signal measurement for at least one of the one or more received signals until one signal measurement is collected at each of the plurality of locations. As an example, a number of the plurality of locations is L. As such, at action 830, the testing device 804 determines and records a signal measurement for the one or more received signals at an L-th location of the plurality of locations. The signal measurement may be a received signal power or an EIRP of at least one of the one or more received signals. The signal measurement at the Lath location can be represented by $R\_(\phi(L),\theta(L))$ or simplified to $R\_L$. That is, at the end of action 830, the testing device 804 may have obtained and recorded L signal measurements (one signal measurement at each location of the plurality of locations). The set of L signal measurements at the plurality of locations for the transmission beam j can be represented by $Ej=\{R\_1, R\_2, \ldots R\_L\}$.

At action 835, the DUI 802 determines whether there are more transmission beams in the beam set B to be measured (for testing). If there are more transmission beams in the beam set B, the DUT 802 may return to action 805 and transmits one or more signals using a next transmission beam (e.g., beam j+1) in the beam set B. If all the N transmission beams in the beam set B have been measured, the DUT 802 may terminate all test transmissions as shown by action 838.

At action 840, the testing device 804 determines whether there are more transmission beams in the beam set B to be tested or measured. If there are more transmission beams in the beam set B, the testing device 804 may repeat the actions 810-830 to determine, at each location of a plurality of locations, a signal measurement for at least one of the one or more received signals associate) with the next transmission beam (e.g., beam j+1) of the DUT 802. If all the transmission beams in the beam set B have been measured, the testing device 804 proceeds to action 845.

At action 845, after recording signal measurements at each location of the plurality of locations for each transmission beam in the beam set B, the testing device 804 determines a CDF for the signal measurements for each beam j. The signal measurements for all transmission beams can be represented by $^-E=\{E1, E2, \ldots, EN\}$, where E1 may represent the set of signal measurements for a first transmission beam (in the beam set B) measured at the plurality of locations, E2 may represent the set of signal measurements for a second transmission beam (in the beam set B) measured at the plurality of locations, and so on.

The CDF of a random variable X can be represented by $F(x)$, where $F(x)=Pr(X\leq x)$, which is the probability that X is less than or equal to x. In some aspects, for each transmission j, the testing device 804 may compute a CDF for Ej by calculating a probability distribution function (PDF) for the corresponding set of signal measurements, and then calculate cumulative probabilities from the PDF. Examples of CDF of signal measurements are shown and discussed with reference to FIG. 9.

At action 850, the testing device 804 determines whether an interference condition (e.g., a narrow beam condition) is satisfied for each transmission beam j.

In some instances, the CDF of the recorded EIRPs may be compared to a reference CDF to determine whether the DUT 802 satisfies an interference condition. The reference CDF may be a CDF of a narrow beam signal that satisfies the interference condition. For example, the reference CDF may be a CDF from a previously recorded set of EIRPs that satisfies the interference condition. As another example, the reference CDF may be from a test standard (e.g., a 3GPP standard) that defines a CDF that satisfies the interference condition. In some instances, the reference CDF may be part of a set of reference CDFs that satisfies the interference condition. For example, the set of reference CDFs may include reference CDFs that are matched to particular operating conditions (e.g., frequency of operation, mobility conditions, type of wireless devices, device power class, class of services, interference level tolerance, etc.) and scenarios (e.g., density of wireless devices in the area of the DUT 802).

The narrow beam metric, say for beam b, may be defined as the distance between the kth percentile of $C\_j$ and the kth percentile of $R\_cdf$ where $R\_cdf$ is the CDF of the reference beam, i.e., $M\_(j,1)=k\_1$ th.tile. C th.tile.$R\_cdf$ and $M\_(j,2)=k\_2$ th.tile. C th.tile.$R\_cdf$. Here, $C\_j$ may be the CDF of the set of recorded signals measurements (e.g., EIRPs) recorded for N different signal beams (i.e., beam 1, ..., beam N) as described above in actions 805 to 840. The narrow beam condition that may satisfy an interference condition may include a condition in which $M\_(j,1)$ is less than a predefined threshold, say $d\_1,1$. Additionally or alternatively, the narrow beam condition that may satisfy an interference condition may include multiple conditions. For example, the narrow beam condition that satisfies the interference condition may include the condition in which M is less than a predefined threshold, say $d\_1,1$ and $M\_(j,2)$ is less than a predefined threshold, say $d\_1,2$. Although the previous condition requires the distance between the kth percentile of $C\_j$ (e.g., the CDF of the beams transmitted by the DUT 802) and the kth percentile of $R\_cdf$ (e.g., the reference CDF) to be less than two respective thresholds, the present disclosure is not so limited and any number of percentiles on the CDFs may be compared to a threshold. As described above with reference to FIG. 3, a channel access procedure may be based on the comparison of the CDF of the DUT 802 beams and the reference CDF. For example, if the transmission beam b satisfies the interference condition, the DUT 802 may refrain from performing an LBT and/or long-term sensing before accessing a wireless channel. As another example, if the transmission beam b fails to satisfy the interference condition, the DUT 802 may perform an LBT and/or a long-term sensing before accessing the wireless channel.

Additionally or alternatively, the criteria for satisfying an interference condition (e.g., a narrow beam metric) in action 850 may be based on a divergence metric. The narrow beam metric may be defined as the divergence metric between C_j (the CDF of the beam b transmitted from DUT 802) and the R_cdf (the reference CDF). The divergence metric may include, without limitation, a Kullback-Liebler divergence measure, a Wasserstein distance, a normalized difference in mean, a normalized difference in variance, a difference in energy, a Jensen-Shannon divergence measure, a Hellinger distance, a Bhattacharyya distance, etc. The divergence metric may be represented as M_j=div.metric(C_j,R_cdf) in which the DUT 802 satisfies the interference condition if M_j is less than a predefined threshold, say d_2. In some instances, the thresholds d_1,1, d_1,2 and d_2 may be considered as a target distance that relates to the maximum tolerable interference level. In some instances, the thresholds d_1,1, d_1,2 and d_2 may be based on parameters and/or operating conditions of the DUT 802 (e.g., the DUT 802 power class).

Figure 9:
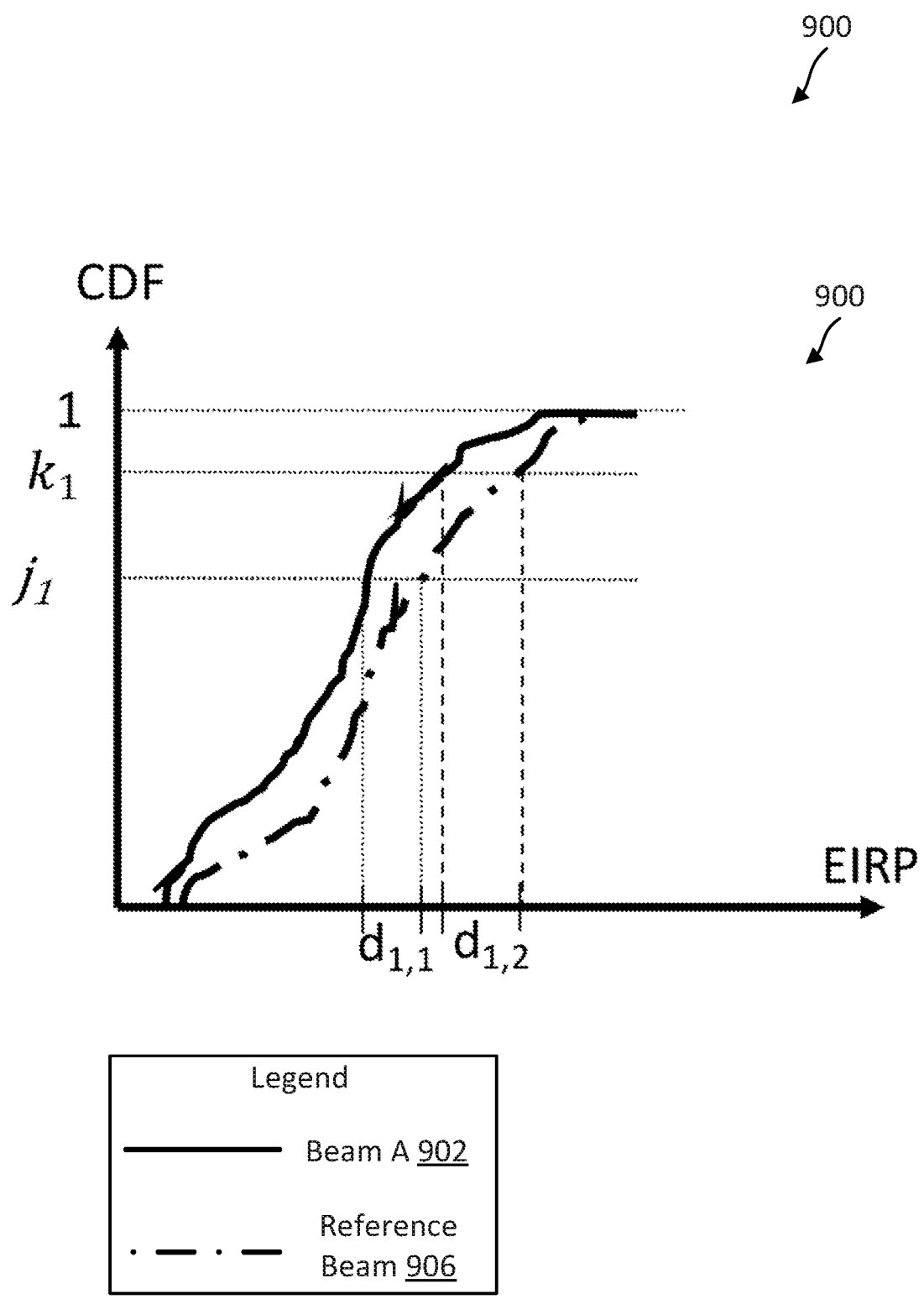
FIG. 9 illustrates a graph of an interference condition determination scheme according to some aspects of the present disclosure.

FIG. 9 illustrates a graph 900 of an interference condition determination scheme according to some aspects of the present disclosure. Graph 900 illustrates a CDF curve of a beam A 902 and a CDF curve of a reference beam 906. Beam A 902 may be a transmission beam 524 as described above with reference to FIGS. 5, 6A, 6B, 7A, and 7B. Beam A 902 may be transmitted by a wireless device. For example, beam A 902 may be transmitted by BSs such as the BSs 105 and/or 205 and/or UEs such as the UEs 115 and/or 215. The reference beam 906 may be a theoretical beam and/or an empirically generated beam that satisfies an interference condition. The beam A 902 may be measured at points located on a sphere as described above with reference to FIGS. 5, 6A, 6B, 7A, and 7B. A CDF of beam A 902 is plotted next to a CDF of reference beam 906 as shown in FIG. 9. In some instances, the criteria for determining whether the beam A 902 satisfies the interference condition (e.g., a narrow beam condition) may include determining a distance between beam A 902 and the reference beam 906. For example, the criteria may require that the difference $d_{1,2}$ between the beam A 902 and the reference beam 906 at the $k_1$ percentile be less than a threshold. As another example, the criteria may require that the difference $d_{1,2}$ between the beam A 902 and the reference beam 906 at the k1 percentile be less than a first threshold and the difference $d_{1,1}$ between the beam A 902 and the reference beam 906 at the $j_1$ percentile be less than a second threshold. In some instances, the distance between beam A 902 and the reference beam 906 may be determined at multiple points (e.g., different percentiles) along the CDF curves.

Additionally or alternatively, the criteria for satisfying an interference condition (e.g., a narrow beam metric) may be based on a divergence metric. The narrow beam metric for beam A 902 may be defined as the divergence metric between beam a 902 and the reference beam 906. The divergence metric may compare the beam A 902 and the reference beam 906 at multiple points and/or continuously across the CDF curves. The divergence metric may include, without limitation, a Kullback-Liebler divergence measure, a Wasserstein distance, a normalized difference in mean, a normalized difference in variance, a difference in energy, a Jensen-Shannon divergence measure, a Hellinger distance, a Bhattacharyya distance, etc.

Figure 10:
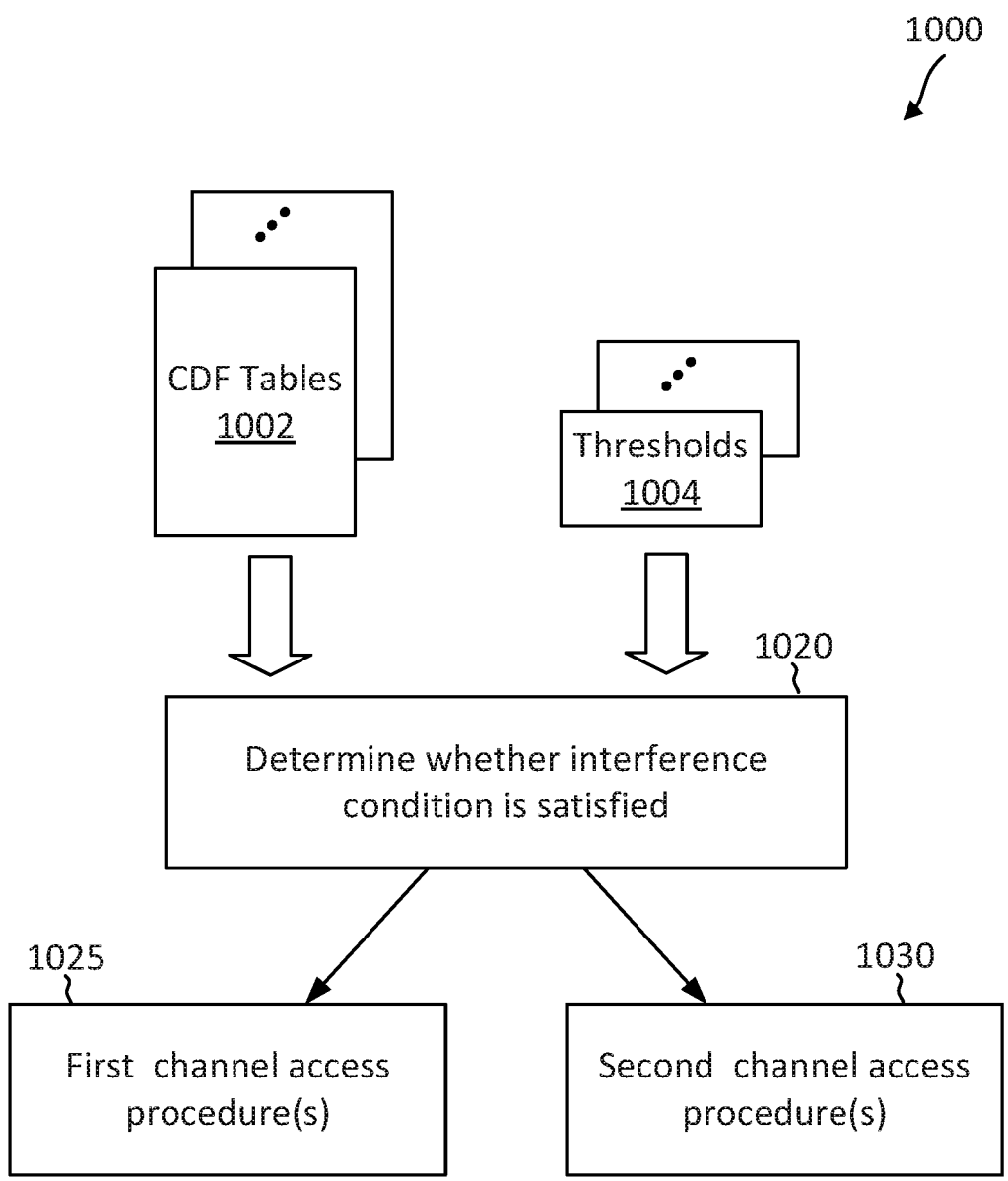
FIG. 10 illustrates a channel access method according to some aspects of the present disclosure.

FIG. 10 illustrates a channel access method 1000 according to some aspects of the present disclosure. The method 1000 may be employed by BSs such as the BSs 105 and/or 205 and/or UEs such as the UEs 115 and/or 215. In particular, a wireless communication device (e.g., a BS or a LIE) may determine which channel access procedure(s) to use for channel access in an unlicensed band, for example, in the mmWave range or sub-THz range, using the method 1000. In some aspects, the wireless communication device may be a BS similar to the BS 105, 205, and/or 1100 and may utilize one or more components, such as the processor 1102, the memory 1104, the interference module 1108, the transceiver 1110, the modem 1112, and the one or more antennas 1116 with reference to FIG. 11, to execute the actions of the method 1000. In other aspects, the wireless communication device may be similar to a UE such as the UEs 115, 215, and/or wireless communication device 1200, and may utilize one or more components, such as the processor 1202, the memory 1204, the interference module 1208, the transceiver 1210, the modem 1212, and the one or more antennas 1216 with reference to FIG. 12, to execute the actions of the method 1000.

At a high level, in the method 1000, a wireless communication device may utilize similar metric(s) (e.g., a comparing a CDF of transmitted beams to a reference CDF) and interference conditions discussed above in the method 800 with reference to FIG. 8 to select a channel access configuration or procedure during operation (e.g., in real-time).

At block 1020, a wireless communication device (e.g., a BS 105, 205, 1100, a UE 115, 215, or wireless communication device 1200) may determine whether an interference condition is satisfied. The interference condition may be related to the narrowness of a transmission beam to be used for transmitting a communication signal. The narrowness of the transmission beam may be in terms of its interference to surrounding nodes. In some instances, the transmission beam may be similar to the transmission beam 202 discussed above with reference to FIG. 2, the transmission beam with the main lobe and side lobes discussed above with reference to FIG. 4, the transmission beam 524 discussed above with reference to FIG. 5, or the transmission beam j discussed above with reference to FIG. 8. The determination of whether the interference condition is satisfied may include determining whether a distance (e.g., a difference, a divergence metric) between a k-th percentile signal measurement of signal measurements of the transmission beam at a plurality of locations and a k-th percentile of the reference CDF satisfies a threshold. The signal measurements of the transmission beam at the plurality of locations may be obtained using the method 800 discussed above with reference to FIG. 8.

In some aspects, the wireless communication device may have one or more CDF tables 1002 and/or one or more thresholds 1004 stored at a memory (e.g., the memory 1104 and 1204) of the wireless communication device. For instance, in some aspects, a first CDF table 1002 of the CDF tables 1002 may be a CDF of signal measurements associated with the transmission beam. The first CDF table 1002 may include cumulative probabilities of the signal measurements similar to the curve 902 discussed above with reference to FIG. 9. The wireless communication device may perform a table lookup to obtain the k-th percentile signal measurement from the first CDF table 1002. In some aspects, the wireless communication device may select the threshold from the one or more thresholds 1004 for the comparison used for determining whether the interference condition is satisfied. For instance, if the distance between a k-th percentile signal measurement and a k-th percentile of the reference CDF is less than the selected threshold, the transmission beam satisfies the interference condition. If, however, the distance between the k-th percentile signal measurement and the k-th percentile of the reference CDF is greater than the selected threshold, the transmission beam does not satisfy the interference condition. In some aspects, the wireless communication device may determine the value k for k-th percentile signal measurement to be used for the metric and/or the selected threshold based on operating parameter(s) and/or conditions(s) of the wireless communication device. The operating parameter(s) and/or conditions(s) may include, but are not limited to, a device power class of the wireless communication device, regulations that regulate a frequency band to be used for transmitting the communication signal, and/or interference tolerance level (e.g., a maximum interference tolerance level) of the wireless communication device.

In some aspects, a second CDF table 1002 of the one or more CDF tables 1002 may also be associated with the transmission beam (to be used for transmitting the communication signal) but may be associated with a different operating condition. For instance, the first CDF table 1002 may be for operating in a frequency band regulated by a regulation A, and the second CDF table 1002 may be for operating in a frequency band regulated by a regulation B. As such, the wireless communication device may select a CDF table 1002 from the one or more CDF tables 1002 based on an operating condition (to be used for the transmission) and may determine the k-th percentile signal measurement from the selected CDF table 1002.

At block 1020, if the narrow beam condition is satisfied, the wireless communication device may utilize a first set of channel access procedures at block 1025. In some aspects, the first set of channel access procedures may include a channel access without performing an LBT and/or long-term sensing. In some aspects, the first set of channel access procedures at block 1025 may also include various restrictions on the transmission power, the transmission duty cycle, and/or the beam dwell time that the wireless communication device may use.

If, however, the narrow beam condition is not satisfied, the wireless communication device may proceed to block 1030. At block 1030, the wireless communication device may utilize a second set of channel access procedures. In some aspects, the second set of channel access procedures may include a channel access after a successful LBT and/or a low interference detection from long-term sensing. In some aspects, the second set of channel access procedures may also include various restrictions on the transmission power, the transmission duty cycle, and/or the beam dwell time that the wireless communication device may use.

Further, in some aspects, the wireless communication device may utilize the k-th percentile signal measurement to determine whether the wireless communication device satisfies the interference condition when the transmit power to be used for transmitting the communication signal exceeds a certain threshold (e.g., T 3). That is, if the transmit power (to be used for transmitting the communication signal) does not exceed the threshold, the wireless communication device may proceed to block 1025 and utilize the first set of channel access procedure(s) (e.g., with no LBT and/or no long-term sensing) to access the channel for transmitting the communication signal.

Figure 11:
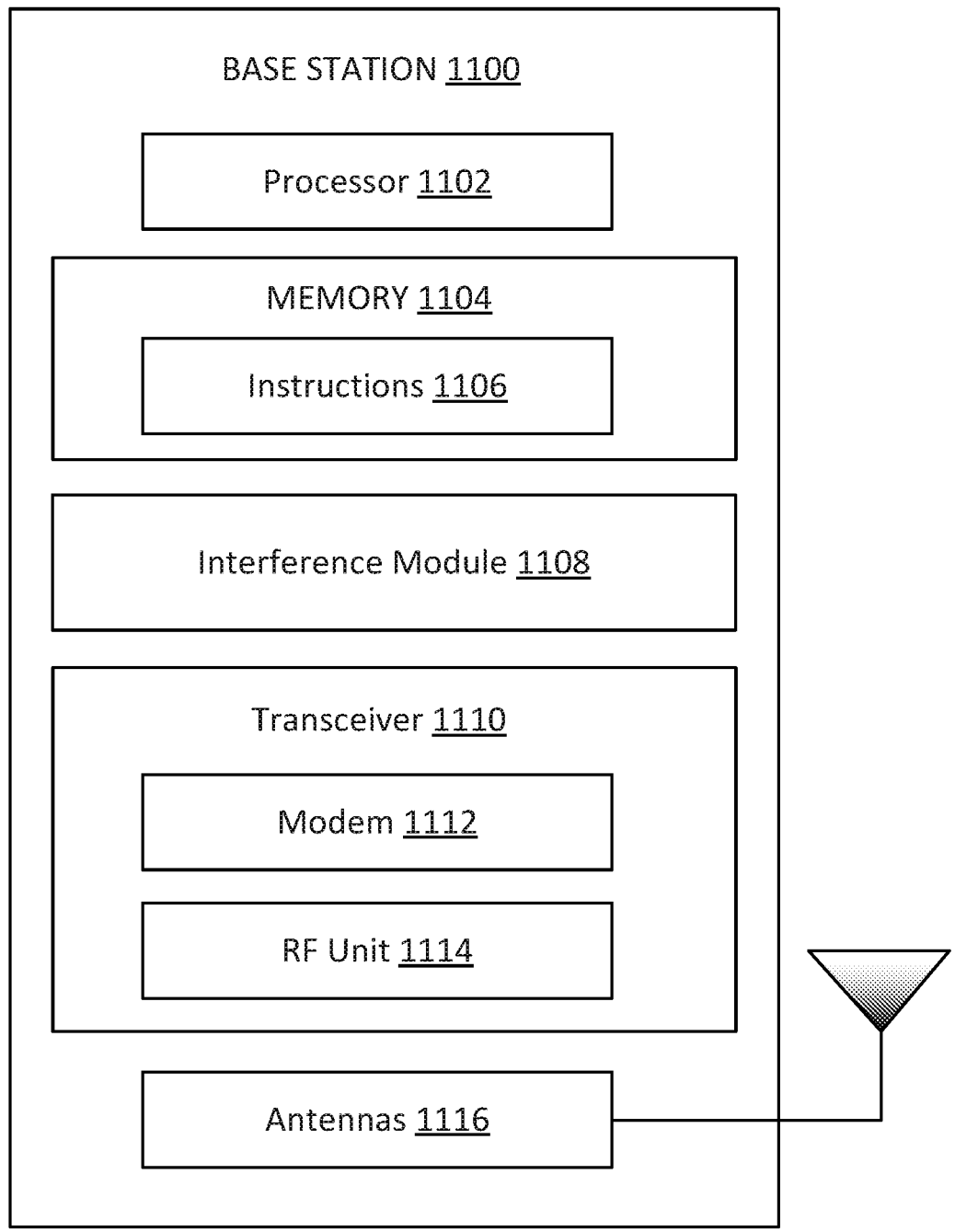
FIG. 11 illustrates a block diagram of a base station (BS) according to some aspects of the present disclosure.

FIG. 11 is a block diagram of an exemplary BS 1100 according to some aspects of the present disclosure. The BS 1100 may be a BS 105 as discussed in FIGS. 1-5. As shown, the BS 1100 may include a processor 1102, a memory 1104, an interference module 1108, a transceiver 1110 including a modem subsystem 1112 and a RF unit 1114, and one or more antennas 1116. These elements may be coupled with one another. The term "coupled" may refer to directly or indirectly coupled or connected to one or more intervening elements. For instance, these elements may be in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1104 may include a non-transitory computer-readable medium. The memory 1104 may store instructions 1106. The instructions 1106 may include instructions that, when executed by the processor 1102, cause the processor 1102 to perform operations described herein, for example, aspects of FIGS. 1-10 and 12-13. Instructions 1106 may also be referred to as program code. The program code may be for causing a wireless communication device to perform these operations, for example by causing one or more processors (such as processor 1102) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The interference module 1108 may be implemented via hardware, software, or combinations thereof. For example, the interference module 1108 may be implemented as a processor, circuit, and/or instructions 1106 stored in the memory 1104 and executed by the processor 1102. In some examples, the interference module 1108 can be integrated within the modem subsystem 1112. For example, the interference module 1108 can be implemented by a combination of software components (e.g., executed by a DSP or a general processor) and hardware components (e.g., logic gates and circuitry) within the modem subsystem 1112. The interference module 1108 may communicate with one or more components of BS 1100 to implement various aspects of the present disclosure, for example, aspects of FIGS. 1-10 and 13-14.

In some aspects, the interference module 1108 is configured to determine whether a wireless communication device satisfies an interference condition based on a cumulative distribution of signal measurements at a plurality of locations and a reference probability distribution. For example, transceiver 1110 may process multiple beams from a wireless device (e.g., UE 115, 215). The beams may be processed by processor 1102 as described above with reference to FIG. 8. The beams may be received by antennas 1116. The antennas 1116 may be arranged in a spherical pattern as described above with reference to FIGS. 5, 6A, 6B, 7A, and 7B. In some instances, processor 1102 may compute a CDF of the received beams. Processor 1102 may compare the CDF of the received beams to a reference beam as described above with reference to FIG. 9, If processor 1102 determines that the received beams satisfy or do not satisfy an interference condition (e.g., a narrow beam condition), BS 1100 may transmit a control message to the wireless device that transmitted the beams indicating the beams satisfy or do not satisfy the interference condition.

In some aspects, the interference module 1108 is configured to determine whether a DUT (e.g., a DUT 802, a UE 115, 215, a wireless communication device 1200, a BS 105, 205) satisfies an interference condition (e.g., a narrow beam condition), for example, in a conformance test or manufacturing test. For example, the transceiver 1110 is configured to receive, from the DUT via the antennas 1116, one or more signals associated with a beam parameter (e.g., a beam direction of a transmission beam of the DUT). The one or more signals may be received from a plurality of locations, each at a respective azimuth angle and a respective elevation angle with respect to the DUT. In some aspects, the antennas 1116 may be arranged in a spherical pattern as described above with reference to FIGS. 5-7, In some aspects, the antennas 1116 may be arranged in any spatial configuration that supports determining whether a DUT satisfies an interference condition The processor 1102 is configured to compute one signal measurement (e.g., EIRPs) at each location of the plurality of locations, compute a CDF of the received signal measurements, and compare the CDF of the received signal measurements to a reference CDF. The processor 1102 is further configured to compare the difference between the CDF of the received signal measurements and the reference CDF to a threshold as discussed above reference to FIG. 9. If the difference is less than the threshold, the DUT satisfies the interference condition. In some aspects, the processor 1102 is configured to determine the difference between the CDF of the received signal measurements and the reference CDF at multiple percentiles (e.g., k-th percentile, j-th percentile, etc.). The processor 1102 may be configured to compare the differences at each of the multiple percentiles to a threshold to determine if the DUT satisfies the interference condition. Each comparison may use the same threshold or a different threshold for each percentile.

In some aspects, the interference module 1108 is configured to select a channel access configuration (e.g., channel access parameters or procedures) for transmitting a communication signal in an unlicensed frequency band using a transmission beam during operation (in real-time). For example, the processor 1102 is configured to perform the selection based on a k-th percentile signal measurement of signal measurements of a transmission beam at a plurality of locations as discussed above with reference to FIG. 10. The signal measurements may include one signal measurement at each of a plurality of locations. The transceiver 1110 is configured to transmit, based on the channel access configuration and using the transmission beam, the communication signal in the unlicensed frequency band. For instance, if the interference condition is satisfied, the transceiver 1110 may transmit the communication signal using the transmission beam without performing channel sensing (e.g., an LBT or long-term sensing). If, however, the interference condition is not satisfied, the transceiver 1110 may perform an LBT and/or long-term sensing prior to transmitting the communication signal using the transmission beam.

In some aspects, one or more tables of CDF of signal measurements stored at the memory 1104, and the interference module 1108 is configured to obtain the k-th percentile signal measurement by performing a table lookup from the stored CDF tables.

As shown, the transceiver 1110 may include the modem subsystem 1112 and the RF unit 1114. The transceiver 1110 can be configured to communicate bi-directionally with other devices, such as the UEs 115 and/or BS 1100 and/or another core network element. The modem subsystem 1112 may be configured to modulate and/or encode data according to a MCS, e.g., a LDPC coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data (e.g., narrow transmission beams, interference test beams, RRC configurations, MIB, SIB, PDSCH data and/or PDCCH DCIs, etc.) from the modem subsystem 1112 (on outbound transmissions) or of transmissions originating from another source such as a UE 115, 215, and/or UE 1500. The RF unit 1114 may be further configured to perform analog beamforming in conjunction with the digital beamforming. Although shown as integrated together in transceiver 1110, the modem subsystem 1112 and/or the RF unit 1114 may be separate devices that are coupled together at the BS 1100 to enable the BS 1100 to communicate with other devices.

The RF unit 1114 may provide the modulated and/or processed data, e.g., data packets (or, more generally, data messages that may contain one or more data packets and other information), to the antennas 1116 for transmission to one or more other devices. The antennas 1116 may further receive data messages transmitted from other devices and provide the received data messages for processing and/or demodulation at the transceiver 1110, The transceiver 1110 may provide the demodulated and decoded data (e.g., narrow transmission beams, interference test beams, PUSCH data, PUCCH UCI, MSG1, etc.) to the interference module 1108 for processing. The antennas 1116 may include multiple antennas of similar or different designs in order to sustain multiple transmission links.

In an aspect, the BS 1100 can include multiple transceivers 1110 implementing different RATs (e.g., NR and LTE). In an aspect, the BS 1100 can include a single transceiver 1110 implementing multiple RATs (e.g., NR and LTE). In an aspect, the transceiver 1110 can include various components, where different combinations of components can implement different RATs.

Figure 12:
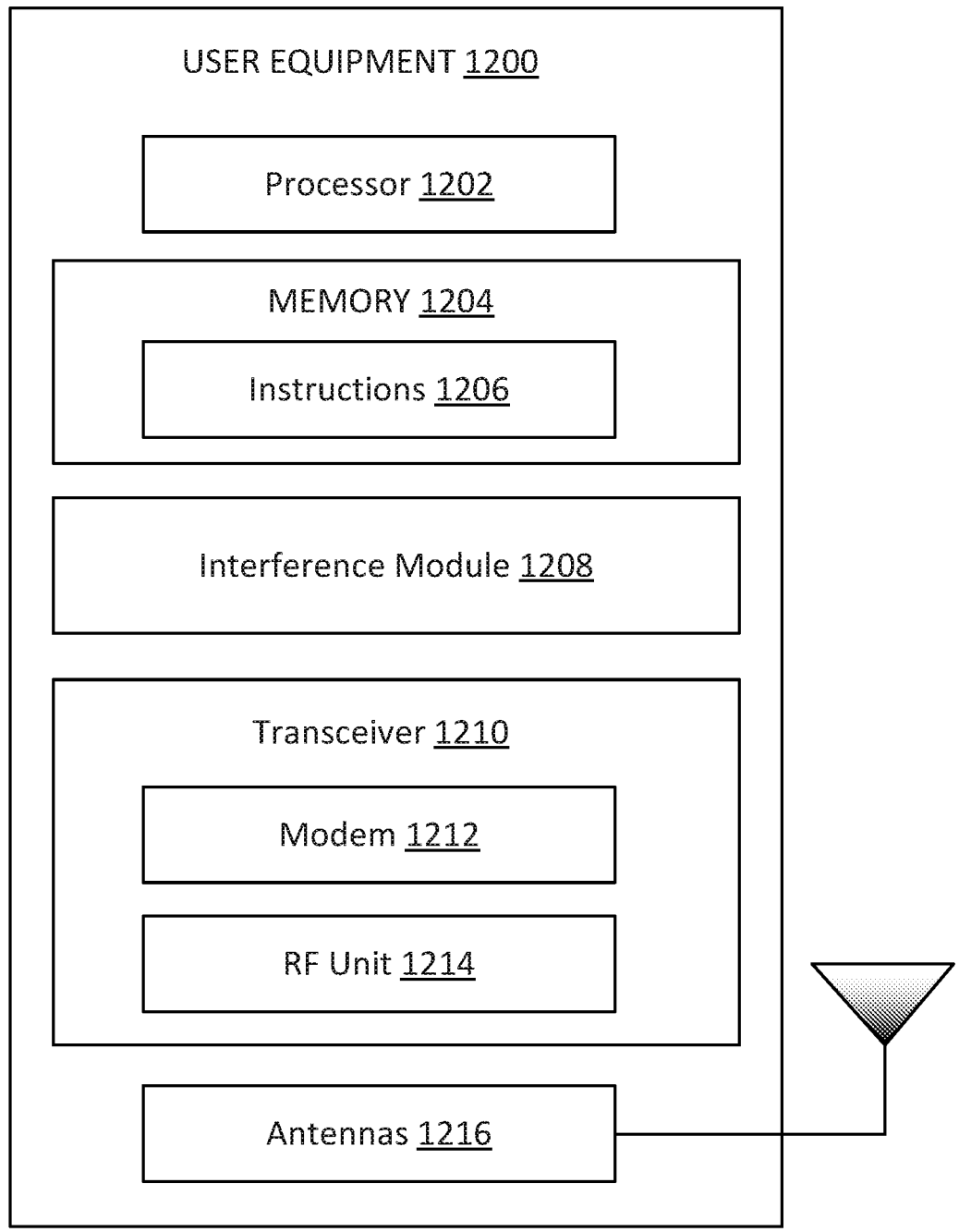
FIG. 12 illustrates a block diagram of a user equipment (LYE) according to some aspects of the present disclosure.

FIG. 12 is a block diagram of an exemplary wireless communication device 1200 according to some aspects of the present disclosure. The wireless communication device 1200 may be a UE 115 as discussed above in FIGS. 1-5. As shown, the wireless communication device 1200 may include a processor 1202, a memory 1204, an interference module 1208, a transceiver 1210 including a modem subsystem 1212 and a radio frequency (RF) unit 1214, and one or more antennas 1216. These elements may be coupled with one another. The term "coupled" may refer to directly or indirectly coupled or connected to one or more intervening elements. For instance, these elements may be in direct or indirect communication with each other, for example via one or more buses.

The processor 1202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1204 includes a non-transitory computer-readable medium. The memory 1204 may store, or have recorded thereon, instructions 1206. The instructions 1206 may include instructions that, when executed by the processor 1202, cause the processor 1202 to perform the operations described herein with reference to a UE 115 or an anchor in connection with aspects of the present disclosure, for example, aspects of FIGS. 1-5. Instructions 1206 may also be referred to as code, which may be interpreted broadly to include any type of computer-readable statement(s) as discussed above with respect to FIG. 14.

The interference module 1208 may be implemented via hardware, software, or combinations thereof. For example, the interference module 1208 may be implemented as a processor, circuit, and/or instructions 1206 stored in the memory 1204 and executed by the processor 1202. In some aspects, the interference module 1208 can be integrated within the modem subsystem 1212. For example, the interference module 1208 can be implemented by a combination of software components (e.g., executed by a DSP or a general processor) and hardware components (e.g., logic gates and circuitry) within the modern subsystem 1212. The interference module 1208 may communicate with one or more components of wireless communication device 1200 to implement various aspects of the present disclosure, for example, aspects of FIGS. 1-10 and 13-14.

In some aspects, the interference module 1208 is configured to determine whether a wireless communication device 1200 satisfies an interference condition based on a cumulative distribution of signal measurements at a plurality of locations and a reference probability distribution. For example, transceiver 1210 may transmit multiple beams. The beams may be transmitted by antennas 1216. The beams may be transmitted to RF sensors that are arranged in a spherical pattern as described above with reference to FIGS. 5, 6A, 6B, 7A, and 7B. A processor connected to the RF sensors may determine that the received beams satisfy or do not satisfy an interference condition (e.g., a narrow beam condition). The wireless communication device 1200 may receive a control message that indicates whether the beams satisfy or do not satisfy the interference condition. The wireless communication device 1200 may access a channel based on whether the beams satisfy or do not satisfy the interference condition. For example, if the beams satisfy the interference condition the wireless communication device 1200 may refrain from performing an LBT and/or an LT when accessing the channel.

In some aspects, the interference module 1208 is configured to select a channel access configuration (e.g., channel access parameters or procedures) for transmitting a communication signal in an unlicensed frequency band using a transmission beam during operation (in real-time). For example, the processor 1202 is configured to perform the selection based on a comparison of a cumulative distribution of the signal measurements of the transmission beam and a reference probability distribution. The signal measurements may include one signal measurement at each of a plurality of locations. The transceiver 1210 is configured to transmit, based on the channel access configuration and using the transmission beam, the communication signal in the unlicensed frequency band. For instance, if the interference condition is satisfied, the transceiver 1210 may transmit the communication signal using the transmission beam without performing channel sensing (e.g., an LBT or long-term sensing). If, however, the interference condition is not satisfied, the transceiver 1210 may perform an LBT and/or long-term sensing prior to transmitting the communication signal using the transmission beam.

In some aspects, one or more tables of CDF of signal measurements stored at the memory 1204, and the interference module 1208 is configured to obtain the k-th percentile signal measurement by performing a table lookup from the stored CDF tables.

As shown, the transceiver 1210 may include the modem subsystem 1212 and the RF unit 1214. The transceiver 1210 can be configured to communicate bi-directionally with other devices, such as the BSs 105 and 1400. The modem subsystem 1212 may be configured to modulate and/or encode the data from the memory 1204 and/or the interference module 1208 according to a modulation and coding scheme (MCS), e.g., a low-density parity check (LDPC) coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data (e.g., narrow beam transmissions, PUSCH data, PUSCH UCI, MSG1, MSG3, etc.) or of transmissions originating from another source such as a UE 115, a BS 105, or an anchor. The RF unit 1214 may be further configured to perform analog beamforming in conjunction with the digital beamforming Although shown as integrated together in transceiver 1210, the modem subsystem 1212 and the RF unit 1214 may be separate devices that are coupled together at the wireless communication device 1200 to enable the wireless communication device 1200 to communicate with other devices.

The RF unit 1214 may provide the modulated and/or processed data, e.g., data packets (or, more generally, data messages that may contain one or more data packets and other information), to the antennas 1216 for transmission to one or more other devices. The antennas 1216 may further receive data messages transmitted from other devices. The antennas 1216 may provide the received data messages for processing and/or demodulation at the transceiver 1210. The transceiver 1210 may provide the demodulated and decoded data (e.g., channel access procedures, RRC configurations, MIB, SIB, PDSCH data and/or PDCCH DCIS, etc.) to the interference module 1208 for processing. The antennas 1216 may include multiple antennas of similar or different designs in order to sustain multiple transmission links.

In an aspect, the wireless communication device 1200 can include multiple transceivers 1210 implementing different RATs (e.g., NR and LTE). In an aspect, the wireless communication device 1200 can include a single transceiver 1210 implementing multiple RATs (e.g., NR and LTE). In an aspect, the transceiver 1210 can include various components, where different combinations of components can implement different RATs.

Figure 13:
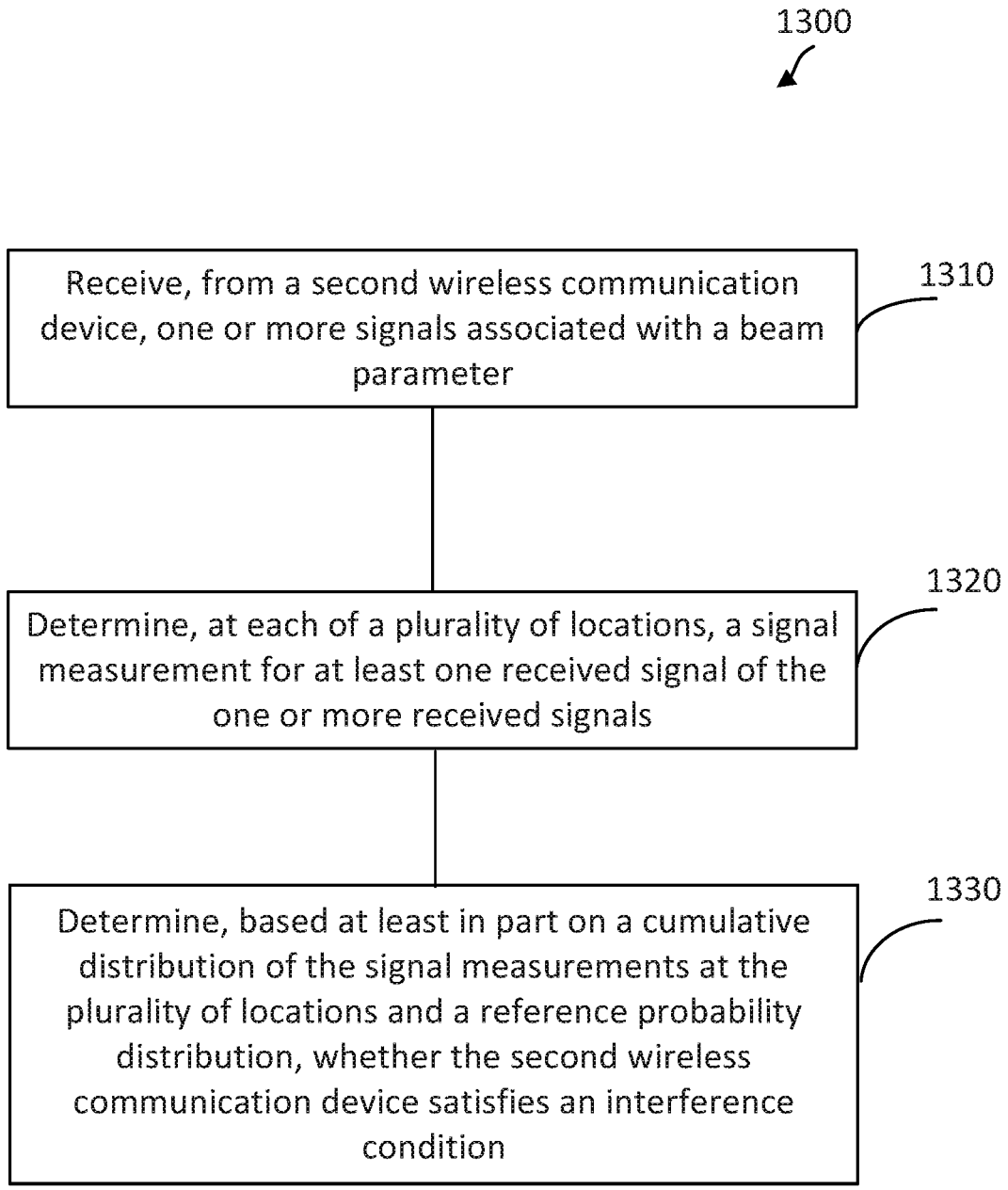
FIG. 13 is a flow diagram of a wireless communication method according to some aspects of the present disclosure.

FIG. 13 is a flow diagram illustrating a wireless communication method 1300 according to some aspects of the present disclosure. Aspects of the method 1300 can be executed by a computing device (e.g., a processor, processing circuit, and/or other suitable component) of a wireless communication device or other suitable means for performing the blocks. In one aspect, a wireless communication device, such as a UE 115, 215, or wireless communication device 1200, may utilize one or more components, such as the processor 1202, the memory 1204, the interference module 1208, the transceiver 1210, the modem 1212, the RF unit 1214, and the one or more antennas 1216, to execute the blocks of method 1300. In another aspect, a wireless communication device, such as a BS 105, 205, or 1100, may utilize one or more components, such as the processor 1102, the memory 1104, the interference module 1108, the transceiver 1110, the modem 1112, the RF unit 1114, and the one or more antennas 1116, to execute the blocks of method 1300. The method 1300 may employ similar mechanisms as described in FIGS. 1-10 and 14. As illustrated, the method 1300 includes a number of enumerated blocks, but aspects of the method 1300 may include additional blocks before, after, and in between the enumerated blocks. In some aspects, one or more of the enumerated blocks may be omitted or performed in a different order.

At block 1310, a wireless communication device (e.g., a BS 105, 205, or 1100, or a LIE 115, 215, or wireless communication device 1200) receives from a second wireless communication device (e.g., a BS 105, 205, or 1100, or a UE 115, 215, or wireless communication device 1200), one or more signals associated with a beam parameter. In some aspects, means for performing the functionality of block 1310 can, but not necessarily, include, for example, interference module 1108, transceiver 1110, antennas 1116, processor 1102, and/or memory 1104 with reference to FIG. 11, or interference module 1208, transceiver 1210, antennas 1216, processor 1202, and/or memory 1204 with reference to FIG. 12.

At block 1320, a wireless communication device (e.g., a BS 105, 205, or 1100, or a UE 115, 215, or wireless communication device 1200) determines, at each of a plurality of locations, a signal measurement for at least one received signal of the one or more received signals. In some aspects, means for performing the functionality of block 1320 can, but not necessarily, include, for example, interference module 1108, transceiver 1110, antennas 1116, processor 1102, and/or memory 1104 with reference to FIG. 11, or interference module 1208, transceiver 1210, antennas 1216, processor 1202, and/or memory 1204 with reference to FIG. 12.

At block 1330, a wireless communication device (e.g., a BS 105, 205, or 1100, or a UE 115, 215, or wireless communication device 1200) determines, based at least in part on a cumulative distribution of the signal measurements at the plurality of locations and a reference probability distribution, whether the second wireless communication device satisfies an interference condition. In some aspects, means for performing the functionality of block 1330 can, but not necessarily, include, for example, interference module 1108, transceiver 1110, antennas 1116, processor 1102, and/or memory 1104 with reference to FIG. 11, or interference module 1208, transceiver 1210, antennas 1216, processor 1202, and/or memory 1204 with reference to FIG. 12.

Figure 14:
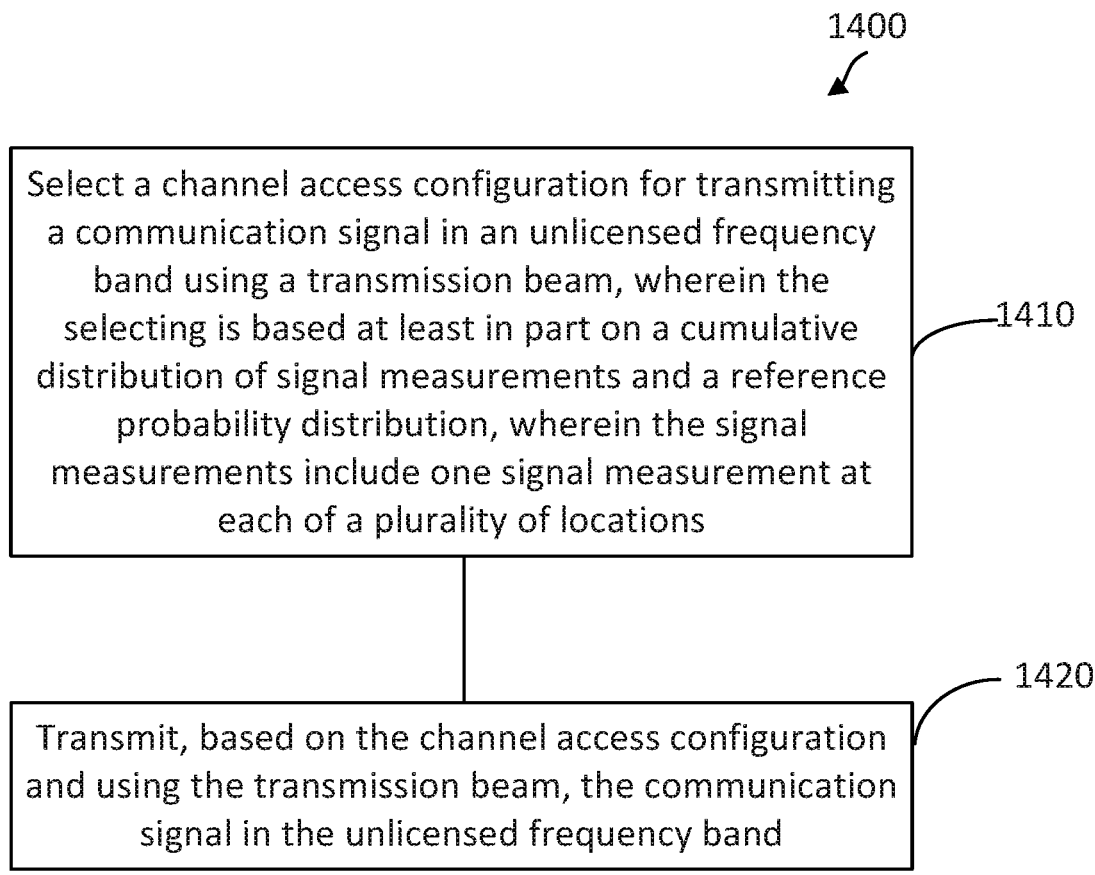
FIG. 14 is a flow diagram of a wireless communication method according to some aspects of the present disclosure.

FIG. 14 is a flow diagram illustrating a wireless communication method 1400 according to some aspects of the present disclosure. Aspects of the method 1400 can be executed by a computing device (e.g., a processor, processing circuit, and/or other suitable component) of a wireless communication device or other suitable means for performing the blocks. In one aspect, a wireless communication device, such as a UE 115, 215, or wireless communication device 1200, may utilize one or more components, such as the processor 1202, the memory 1204, the interference module 1208, the transceiver 1210, the modem 1212, the RF unit 1214, and the one or more antennas 1216, to execute the blocks of method 1400. In another aspect, a wireless communication device, such as a BS 105, 205, or 1100, may utilize one or more components, such as the processor 1102, the memory 1104, the interference module 1108, the transceiver 1110, the modem 1112, the RF unit 1114, and the one or more antennas 1116, to execute the blocks of method 1400. The method 1400 may employ similar mechanisms as described in FIGS. 1-10 and 13. As illustrated, the method 1400 includes a number of enumerated blocks, but aspects of the method 1400 may include additional blocks before, after, and in between the enumerated blocks. In some aspects, one or more of the enumerated blocks may be omitted or performed in a different order.

At block 1410, a wireless communication device (e.g., a BS 105, 205, or 1100, or a LIE 115, 215, or wireless communication device 1200) selects a channel access configuration for transmitting a communication signal in an unlicensed frequency band using a transmission beam, wherein the selecting is based at least in part on a cumulative distribution of signal measurements and a reference probability distribution, wherein the signal measurements include one signal measurement at each of a plurality of locations. In some aspects, means for performing the functionality of block 1410 can, but not necessarily, include, for example, interference module 1108, transceiver 1110, antennas 1116, processor 1102, and/or memory 1104 with reference to FIG. 11, or interference module 1208, transceiver 1210, antennas 1216, processor 1202, and/or memory 1204 with reference to FIG. 12.

At block 1420, a wireless communication device (e.g., a BS 105, 205, or 1100, or a UE 115, 215, or wireless communication device 1200) transmits, based on the channel access configuration and using the transmission beam, the communication signal in the unlicensed frequency band. In some aspects, means for performing the functionality of block 1420 can, but not necessarily, include, for example, interference module 1108, transceiver 1110, antennas 1116, processor 1102, and/or memory 1104 with reference to FIG. 11, or interference module 1208, transceiver 1210, antennas 1216, processor 1202, and/or memory 1204 with reference to FIG. 12.

Further aspects of the present disclosure include the following:

Aspect 1 includes a method of wireless communication performed by a first wireless communication device, the method comprising receiving, from a second wireless communication device, one or more signals associated with a beam parameter, determining, at each of a plurality of locations, a signal measurement for at least one received signal of the one or more received signals, and determining, based at least in part on a cumulative distribution of the signal measurements at the plurality of locations and a reference probability distribution, whether the second wireless communication device satisfies an interference condition.

Aspect 2 includes the method of aspect 1, wherein the plurality of locations is associated with a spherical coverage of the second wireless communication device.

Aspect 3 includes the method of any of aspects 1-2, wherein the determining the signal measurement at each of the plurality of locations comprises determining the signal measurement at a respective azimuth angle and a respective elevation angle with respect to the second wireless communication device.

Aspect 4 includes the method of any of aspects 1-3, wherein the determining the signal measurement at each of the plurality of locations comprises determining an effective isotropic radiated power (EIRP) for the at least one received signal.

Aspect 5 includes the method of any of aspects 1-4, wherein the determining whether the second wireless communication device satisfies the interference condition comprises determining whether a difference between a k-th percentile signal measurement of the sig al measurements at the plurality of locations and a k-th percentile of the reference probability distribution satisfies a threshold.

Aspect 6 includes the method of any of aspects 1-5, wherein the threshold is based on an operating parameter associated with the second wireless communication device.

Aspect 7 includes the method of any of aspects 1-6, wherein a value of k for the k-th percentile signal measurement and the k-th percentile of the reference probability distribution is based on an operating parameter associated with the second wireless communication device.

Aspect 8 includes the method of any of aspects 1-6, wherein, wherein the determining whether the second wireless communication device satisfies the interference condition further comprises determining whether a difference between a k-th percentile signal measurement of the signal measurements at the plurality of locations and a k-th percentile of the reference probability distribution is less than a first threshold, and determining whether a difference between a j-th percentile signal measurement of the signal measurements at the plurality of locations and a j-th percentile of the reference probability distribution is less than a second threshold, wherein a value of k is greater than a value of j.

Aspect 9 includes the method of any of aspects 1-8, wherein the determining whether the second wireless communication device satisfies the interference condition comprises determining whether the second wireless communication device satisfies a narrow beam condition based on a divergence metric between the cumulative distribution of the signal measurements at the plurality of locations and the reference probability distribution.

Aspect 10 includes the method of any of aspects 1-9, wherein the reference probability distribution satisfies a narrow beam condition.

Aspect 11 includes the method of any of aspects 1-10, wherein the reference probability distribution is based on an operating parameter associated with the second wireless communication device.

Aspect 12 includes a method of wireless communication performed by a wireless communication device, the method comprising selecting a channel access configuration for transmitting a communication signal in an unlicensed frequency band using a transmission beam, wherein the selecting is based at least in part on a cumulative distribution of signal measurements and a reference probability distribution, wherein the signal measurements include one signal measurement at each of a plurality of locations, and transmitting, based on the channel access configuration and using the transmission beam, the communication signal in the unlicensed frequency band.

Aspect 13 includes the method of aspect 12, wherein the selecting the channel access configuration is further based on a comparison of a difference between the cumulative distribution of the signal measurements at the plurality of locations and the reference probability distribution against a threshold.

Aspect 14 includes the method of any of aspects 12-13, wherein the threshold is based on an operating parameter of the wireless communication device.

Aspect 15 includes the method of any of aspects 12-14, wherein a value of k for a k-th percentile signal measurement and a k-th percentile of the reference probability distribution is based on an operating parameter of the wireless communication device and selecting the channel access configuration is based on the k-th percentile signal measurement and k-th percentile of the reference probability distribution.

Aspect 16 includes the method of any of aspects 12-15, further comprising determining the k-th percentile signal measurement based on a cumulative distribution function (CDF) of the signal measurements at the plurality of locations.

Aspect 17 includes the method of any of aspects 12-16, wherein the determining the k-th percentile signal measurement of the signal measurements at the plurality of locations based on the CDF comprises performing a table lookup to obtain the k-th percentile signal measurement.

Aspect 18 includes the method of any of aspects 12-17, wherein the selecting the channel access configuration further comprises at least one of determining whether a difference between a k-th percentile signal measurement of the signal measurements at the plurality of locations and the k-th percentile of the reference probability distribution is less than a first threshold, and determining whether a difference between a j-th percentile signal measurement of the signal measurements at the plurality of locations and a j-th percentile of the reference probability distribution is less than a second threshold, wherein a value of k is greater than a value of j.

Aspect 19 includes the method of any of aspects 12-18, wherein the transmitting the communication signal comprises transmitting, based on the channel access configuration, the communication signal using the transmission beam without performing channel sensing.

Aspect 20 includes the method of any of aspects 12-19, wherein the selecting the channel access configuration based at least in part on the cumulative distribution of signal measurements and the reference probability distribution is based on a transmit power to be used for transmitting the communication signal satisfying a threshold.

Aspect 21 includes the method of any of aspects 12-20, wherein the threshold is based on an operating parameter of the wireless communication device.

Aspect 22 includes a wireless communication device comprising a transceiver, a memory, and a processor coupled to the transceiver and the memory, the wireless communication device configured to perform any one of aspects 1-11.

Aspect 22 includes a wireless communication device comprising a transceiver, a memory, and a processor coupled to the transceiver and the memory, the wireless communication device configured to perform any one of aspects 12-21.

Aspect 23 includes a non-transitory computer readable medium including program code, which when executed by one or more processors, causes a wireless communication device to perform the method of any one of aspects 1-11.

Aspect 24 includes a non-transitory computer readable medium including program code, which when executed by one or more processors, causes a wireless communication device to perform the method of any one of aspects 12-21.

Aspect 25 includes an apparatus comprising means for performing the method of any one of aspects 1-11.

Aspect 26 includes an apparatus comprising means for performing the method of any one of aspects 12-21.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a first wireless communication device, the method comprising:
   receiving, from a second wireless communication device, one or more signals associated with a beam parameter;
   determining, at each of a plurality of sensor locations, a signal measurement for at least one received signal of the one or more received signals; and
   determining, based at least in part on a cumulative distribution of the signal measurements at the plurality of sensor locations and a reference probability distribution, whether the second wireless communication device satisfies an interference condition.

2. The method of claim 1, wherein the plurality of sensor locations is associated with a spherical coverage of the second wireless communication device.

3. The method of claim 1, wherein the determining the signal measurement at each of the plurality of sensor locations comprises:
   determining the signal measurement at a respective azimuth angle and a respective elevation angle with respect to the second wireless communication device.

4. The method of claim 1, wherein the determining the signal measurement at each of the plurality of sensor locations comprises:
   determining an effective isotropic radiated power (EIRP) for the at least one received signal.

5. The method of claim 1, wherein the determining whether the second wireless communication device satisfies the interference condition comprises:
   determining whether a difference between a k-th percentile signal measurement of the signal measurements at the plurality of sensor locations and a k-th percentile of the reference probability distribution satisfies a threshold.

6. The method of claim 5, wherein the threshold is based on an operating parameter associated with the second wireless communication device.

7. The method of claim 5, wherein a value of k for the k-th percentile signal measurement and the k-th percentile of the reference probability distribution is based on an operating parameter associated with the second wireless communication device.

8. The method of claim 1, wherein the determining whether the second wireless communication device satisfies the interference condition further comprises:
   determining whether a difference between a k-th percentile signal measurement of the signal measurements at the plurality of sensor locations and a k-th percentile of the reference probability distribution is less than a first threshold; and
   determining whether a difference between a j-th percentile signal measurement of the signal measurements at the plurality of sensor locations and a j-th percentile of the reference probability distribution is less than a second threshold, wherein a value of k is greater than a value of j.

9. The method of claim 1, wherein the determining whether the second wireless communication device satisfies the interference condition comprises:
   determining whether the second wireless communication device satisfies a narrow beam condition based on a divergence metric between the cumulative distribution of the signal measurements at the plurality of sensor locations and the reference probability distribution.

10. The method of claim 1, wherein the reference probability distribution satisfies a narrow beam condition.

11. The method of claim 1, wherein the reference probability distribution is based on an operating parameter associated with the second wireless communication device.

12. A method of wireless communication performed by a wireless communication device, the method comprising:
selecting a channel access configuration for transmitting a communication signal in an unlicensed frequency band using a transmission beam, wherein the selecting is based at least in part on a cumulative distribution of signal measurements and a reference probability distribution, wherein the signal measurements include one signal measurement at each of a plurality of sensor locations; and
transmitting, based on the channel access configuration and using the transmission beam, the communication signal in the unlicensed frequency band.

13. The method of claim 12, wherein the selecting the channel access configuration is further based on a comparison of a difference between the cumulative distribution of the signal measurements at the plurality of sensor locations and the reference probability distribution against a threshold.

14. The method of claim 13, wherein the threshold is based on an operating parameter of the wireless communication device.

15. The method of claim 12, wherein:
a value of k for a k-th percentile signal measurement and a k-th percentile of the reference probability distribution is based on an operating parameter of the wireless communication device; and
selecting the channel access configuration is based on the k-th percentile signal measurement and k-th percentile of the reference probability distribution.

16. The method of claim 15, further comprising:
determining the k-th percentile signal measurement based on a cumulative distribution function (CDF) of the signal measurements at the plurality of sensor locations.

17. The method of claim 16, wherein the determining the k-th percentile signal measurement of the signal measurements at the plurality of sensor locations based on the CDF comprises:
performing a table lookup to obtain the k-th percentile signal measurement.

18. The method of claim 12, wherein the selecting the channel access configuration further comprises at least one of:
determining whether a difference between a k-th percentile signal measurement of the signal measurements at the plurality of sensor locations and a k-th percentile of the reference probability distribution is less than a first threshold; and
determining whether a difference between a j-th percentile signal measurement of the signal measurements at the plurality of sensor locations and a j-th percentile of the reference probability distribution is less than a second threshold, wherein a value of k is greater than a value of j.

19. The method of claim 12, wherein the transmitting the communication signal comprises:
transmitting, based on the channel access configuration, the communication signal using the transmission beam without performing channel sensing.

20. The method of claim 12, wherein the selecting the channel access configuration based at least in part on the cumulative distribution of signal measurements and the reference probability distribution is based on a transmit power to be used for transmitting the communication signal satisfying a threshold.

21. The method of claim 20, wherein the threshold is based on an operating parameter of the wireless communication device.

22. A first wireless communication device comprising:
a memory;
a transceiver; and
at least one processor coupled to the memory and the transceiver, wherein the at least one processor is configured to:
receive, from a second wireless communication device, one or more signals associated with a beam parameter;
determine, at each of a plurality of sensor locations, a signal measurement for at least one received signal of the one or more received signals; and
determine, based at least in part on a cumulative distribution of the signal measurements at the plurality of sensor locations and a reference probability distribution, whether the second wireless communication device satisfies an interference condition.

23. The first wireless communication device of claim 22, wherein the plurality of sensor locations is associated with a spherical coverage of the second wireless communication device.

24. The first wireless communication device of claim 22, wherein the determining the signal measurement at each of the plurality of sensor locations comprises:
determining the signal measurement at a respective azimuth angle and a respective elevation angle with respect to the second wireless communication device.

25. The first wireless communication device of claim 22, wherein the determining the signal measurement at each of the plurality of sensor locations comprises:
determining an effective isotropic radiated power (EIRP) for the at least one received signal.

26. The first wireless communication device of claim 22, wherein the determining whether the second wireless communication device satisfies the interference condition comprises:
determining whether the second wireless communication device satisfies a narrow beam condition based on a divergence metric between the cumulative distribution of the signal measurements at the plurality of sensor locations and the reference probability distribution.

27. The first wireless communication device of claim 22, wherein the reference probability distribution satisfies a narrow beam condition.

28. A first wireless communication device comprising:
a memory;
a transceiver; and
at least one processor coupled to the memory and the transceiver, wherein the at least one processor is configured to:
select a channel access configuration for transmitting a communication signal in an unlicensed frequency band using a transmission beam based at least in part on a cumulative distribution of signal measurements and a reference probability distribution, wherein the signal measurements include one signal measurement at each of a plurality of sensor locations; and transmit, based on the channel access configuration and using the transmission beam, the communication signal in the unlicensed frequency band.

29. The first wireless communication device of claim 28, wherein the selecting the channel access configuration is further based on a comparison of a difference between the cumulative distribution of the signal measurements at the plurality of sensor locations and the reference probability distribution against a threshold.

30. The first wireless communication device of claim 28, wherein the transmitting the communication signal comprises:

transmitting, based on the channel access configuration, the communication signal using the transmission beam without performing channel sensing.

* * * * *